Figure 1A:
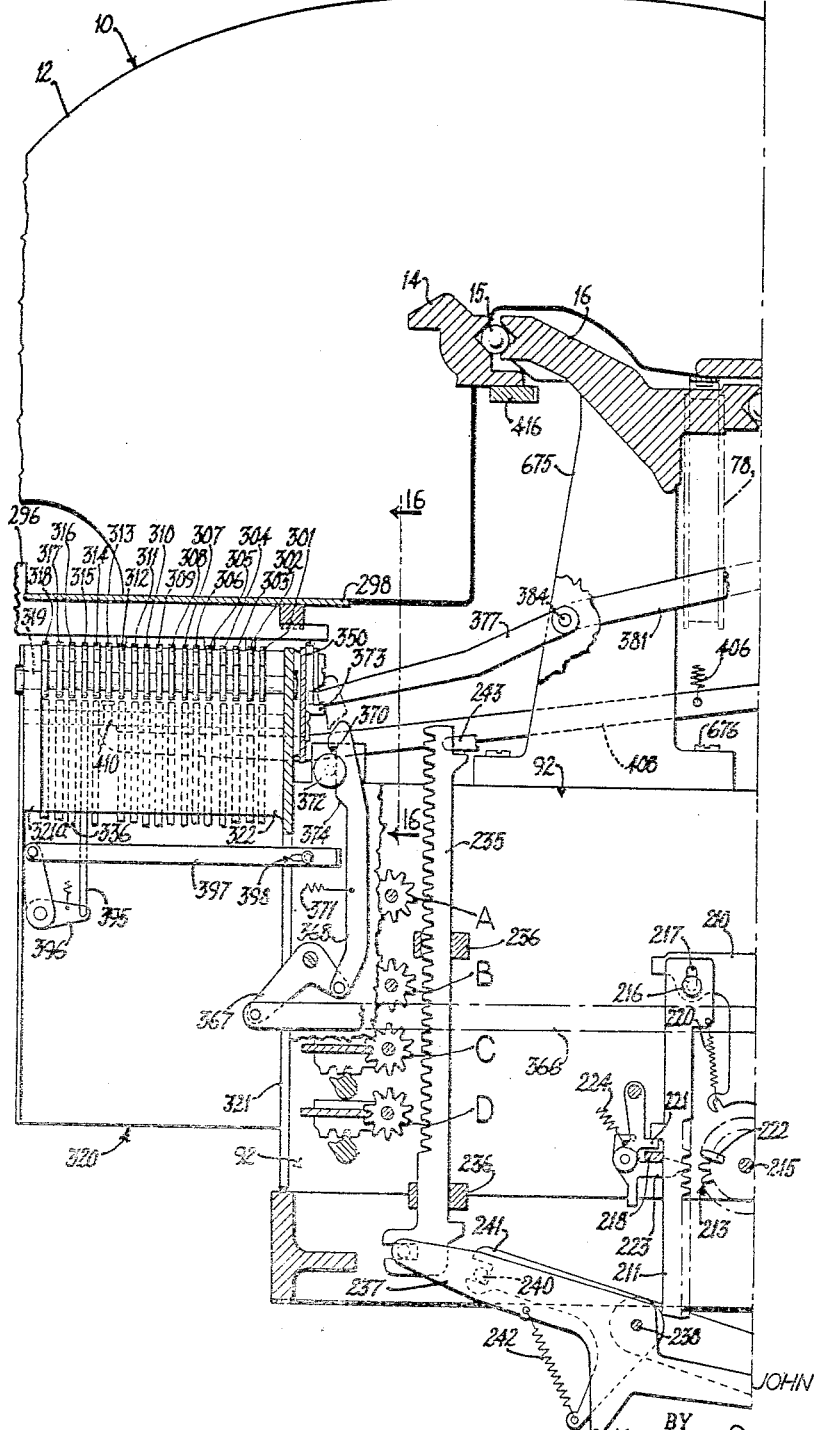

Aug. 24, 1954  J. TOGGENBURGER  2,687,251
PRINTING CONTROL MECHANISM FOR TYPEWRITER-COMPUTERS
Original Filed Dec. 21, 1948  14 Sheets-Sheet 1
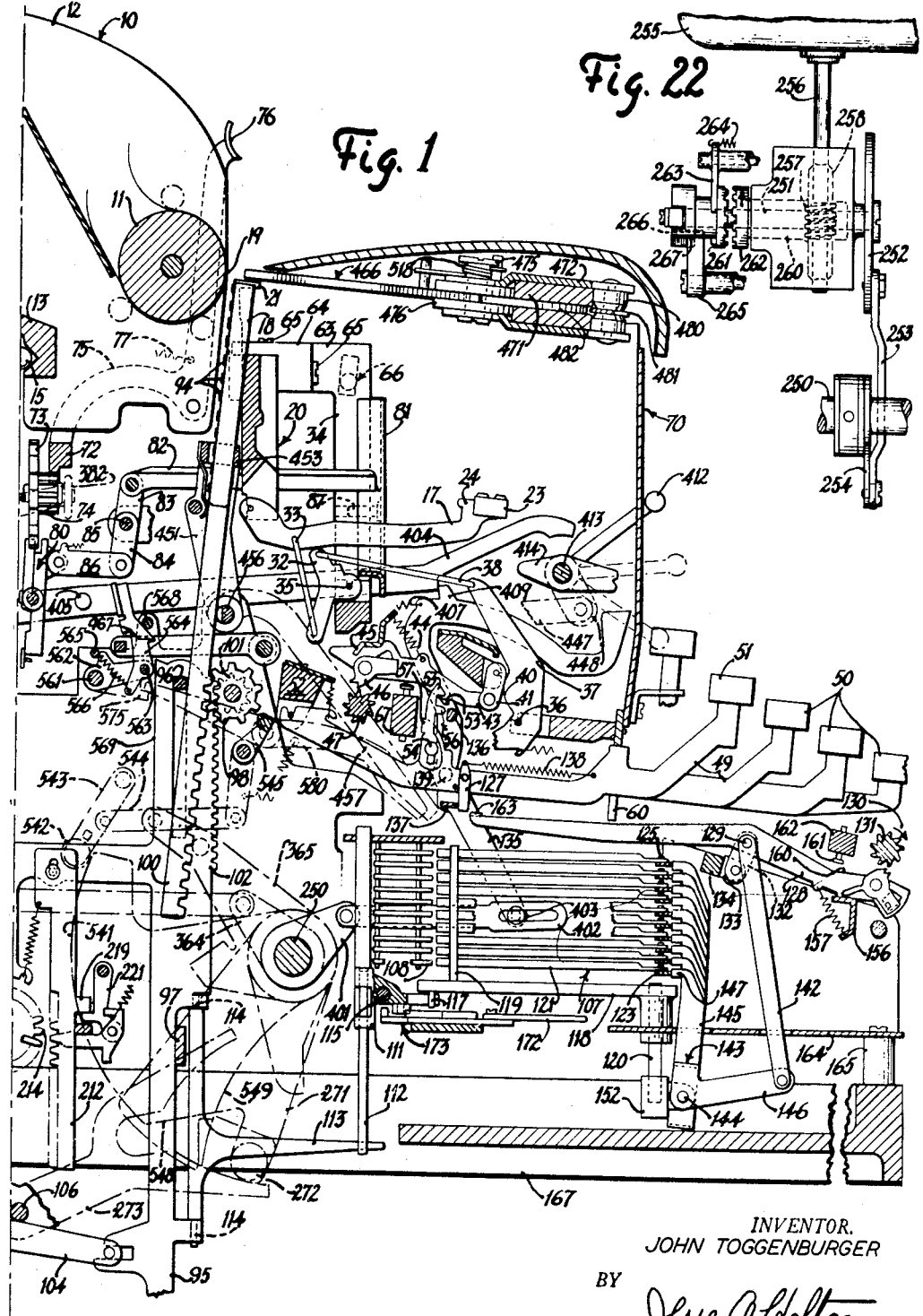
INVENTOR.
JOHN TOGGENBURGER
BY
Jesse A. Holton
ATTORNEY Aug. 24, 1954    J. TOGGENBURGER    2,687,251
PRINTING CONTROL MECHANISM FOR TYPEWRITER-COMPUTERS
Original Filed Dec. 21, 1948    14 Sheets-Sheet 2

INVENTOR.
JOHN TOGGENBURGER
BY
Jesse A. Holton
ATTORNEY

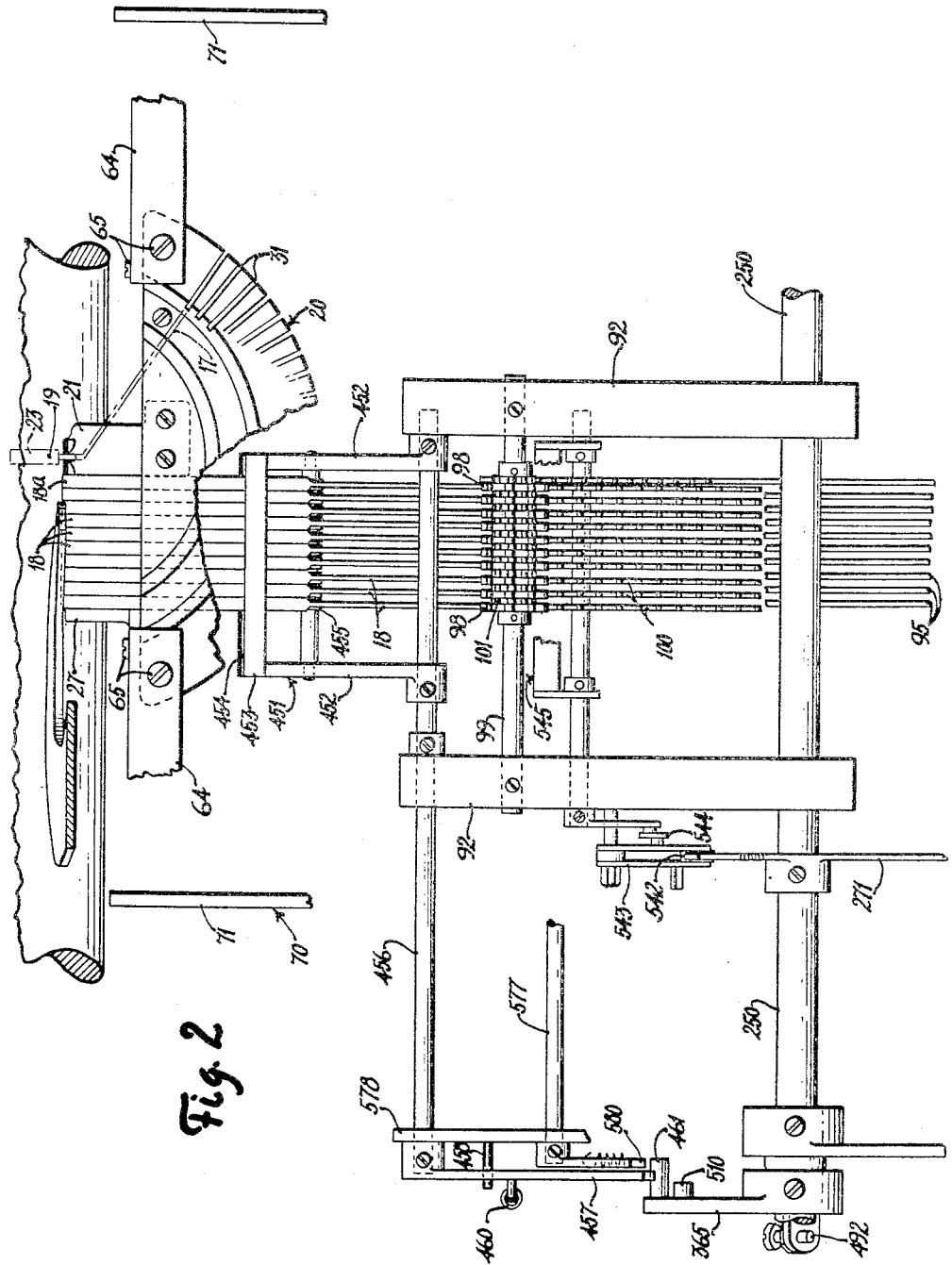

Aug. 24, 1954  J. TOGGENBURGER  2,687,251
PRINTING CONTROL MECHANISM FOR TYPEWRITER-COMPUTERS
Original Filed Dec. 21, 1948  14 Sheets-Sheet 4

INVENTOR.
JOHN TOGGENBURGER
BY
Jesse A. Holton
ATTORNEY

Aug. 24, 1954  J. TOGGENBURGER  2,687,251
PRINTING CONTROL MECHANISM FOR TYPEWRITER-COMPUTERS
Original Filed Dec. 21, 1948  14 Sheets-Sheet 7

INVENTOR
JOHN TOGGENBURGER
BY Jesse A. Holton
ATTORNEY

Aug. 24, 1954   J. TOGGENBURGER   2,687,251
PRINTING CONTROL MECHANISM FOR TYPEWRITER-COMPUTERS
Original Filed Dec. 21, 1948   14 Sheets-Sheet 9
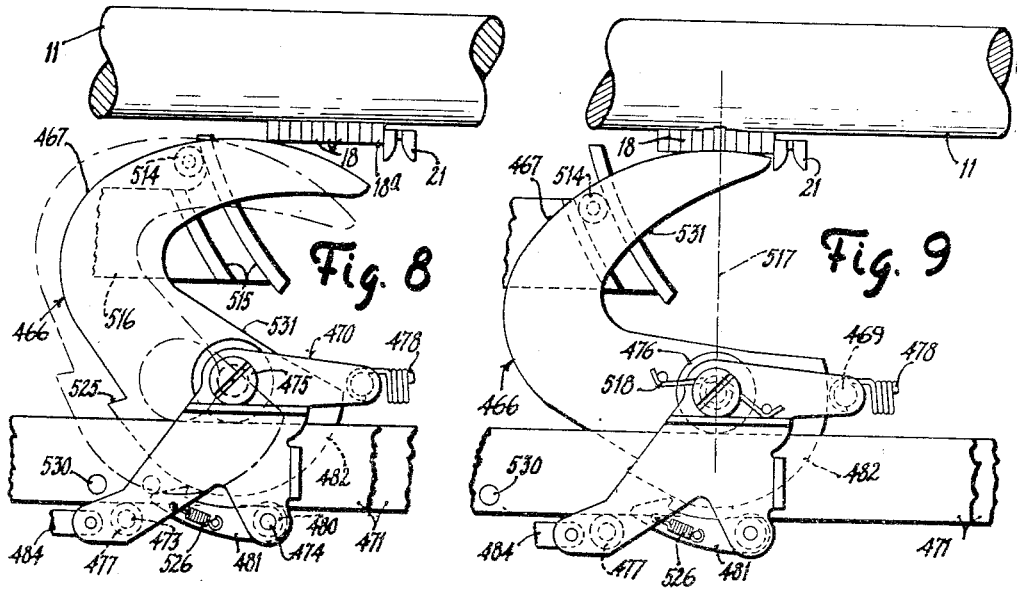
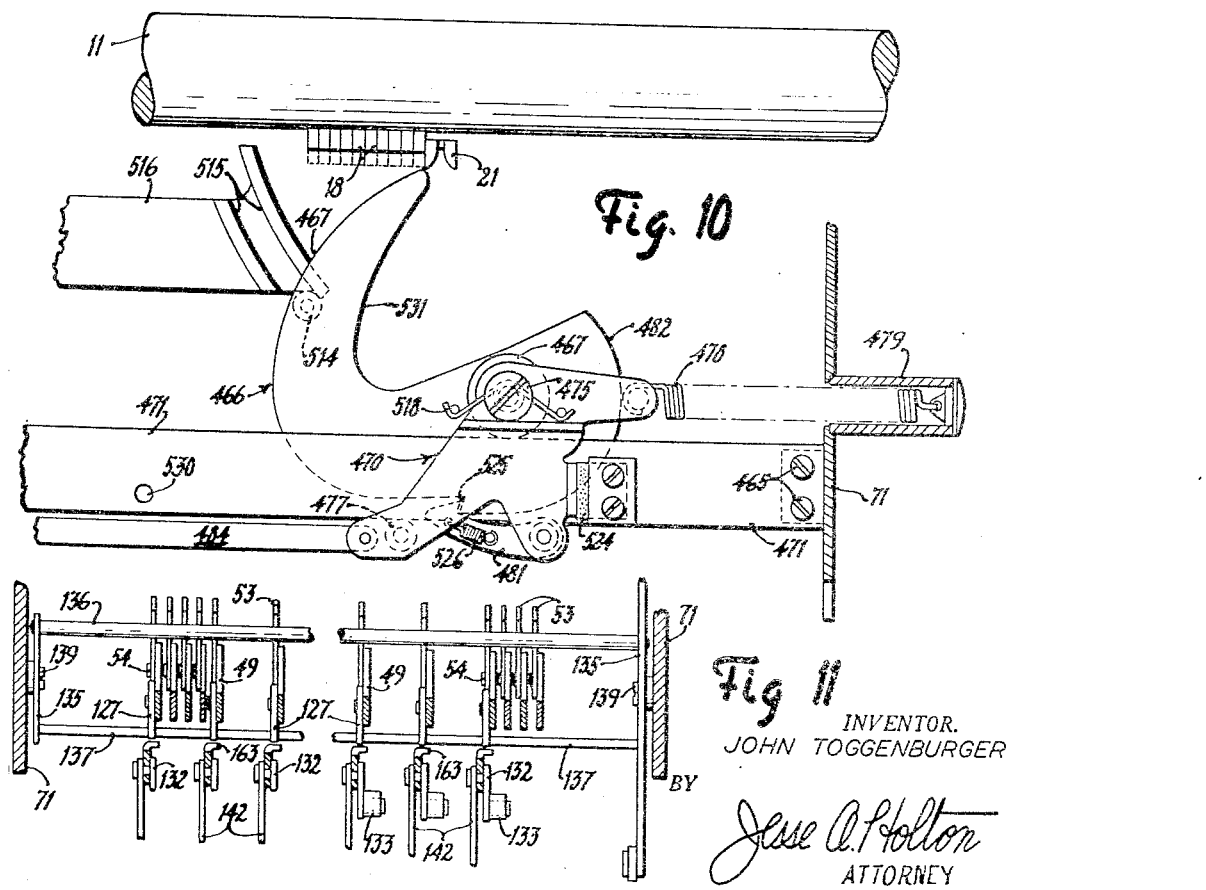
INVENTOR.
JOHN TOGGENBURGER
BY
Jesse A. Holton
ATTORNEY Aug. 24, 1954   J. TOGGENBURGER   2,687,251
PRINTING CONTROL MECHANISM FOR TYPEWRITER-COMPUTERS
Original Filed Dec. 21, 1948   14 Sheets-Sheet 10

INVENTOR.
JOHN TOGGENBURGER
BY
*Jesse A. Holton*
ATTORNEY

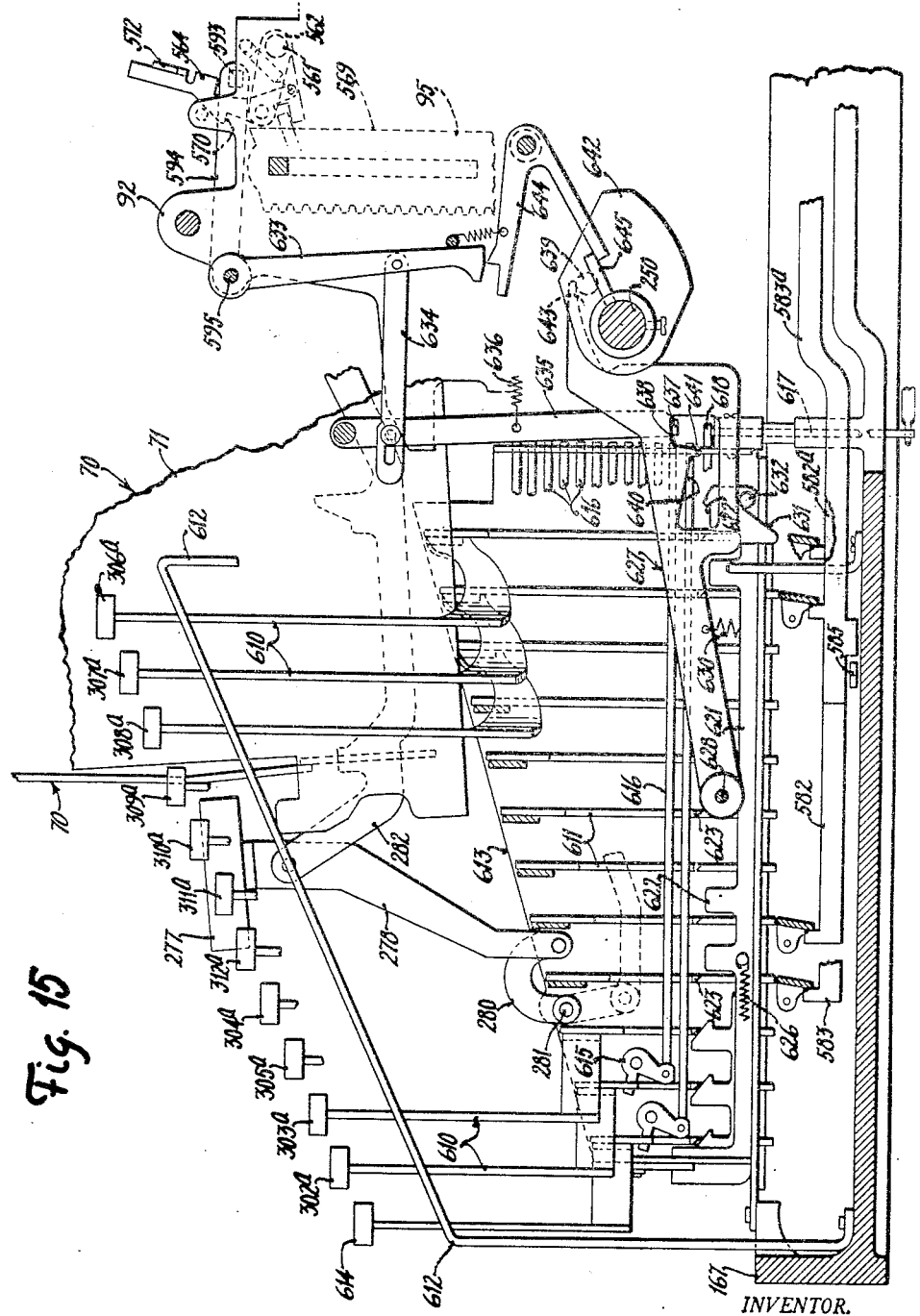

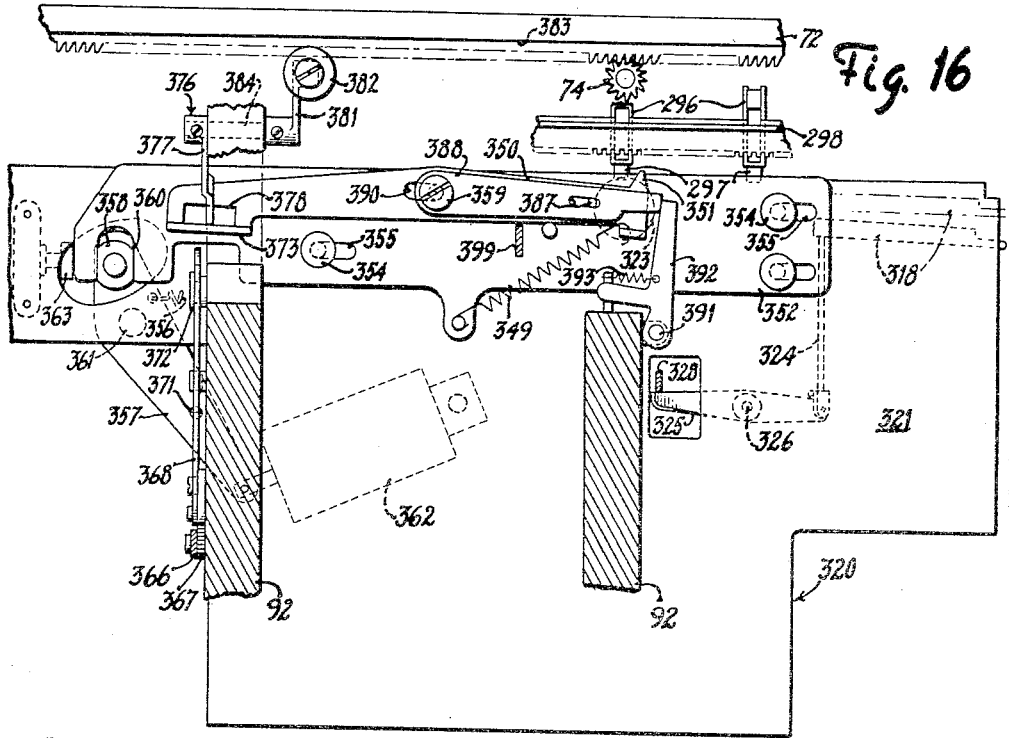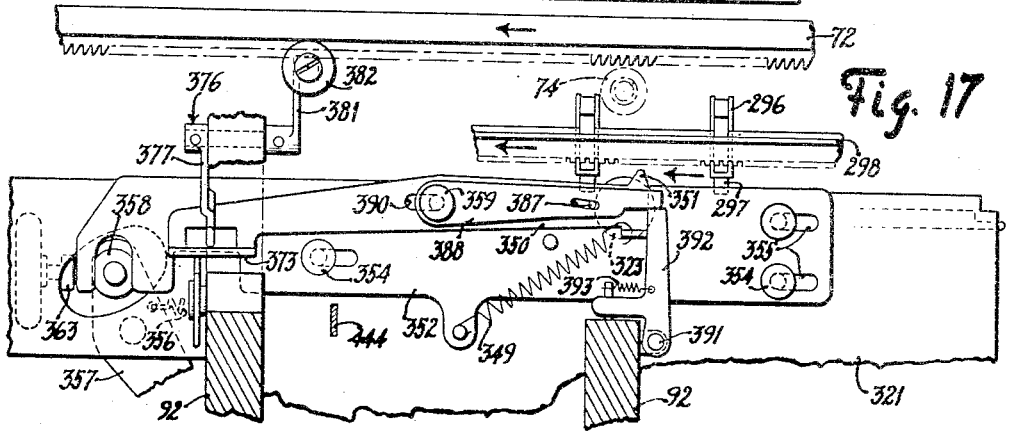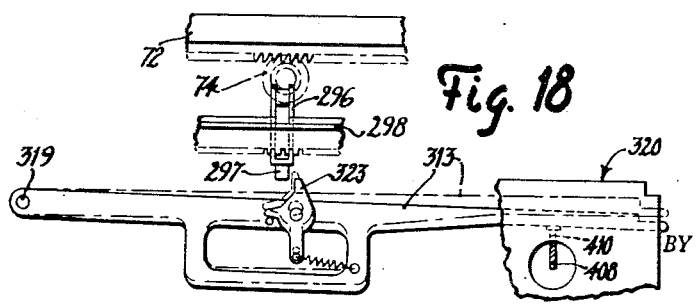

Aug. 24, 1954 J. TOGGENBURGER 2,687,251
PRINTING CONTROL MECHANISM FOR TYPEWRITER-COMPUTERS
Original Filed Dec. 21, 1948 14 Sheets-Sheet 13
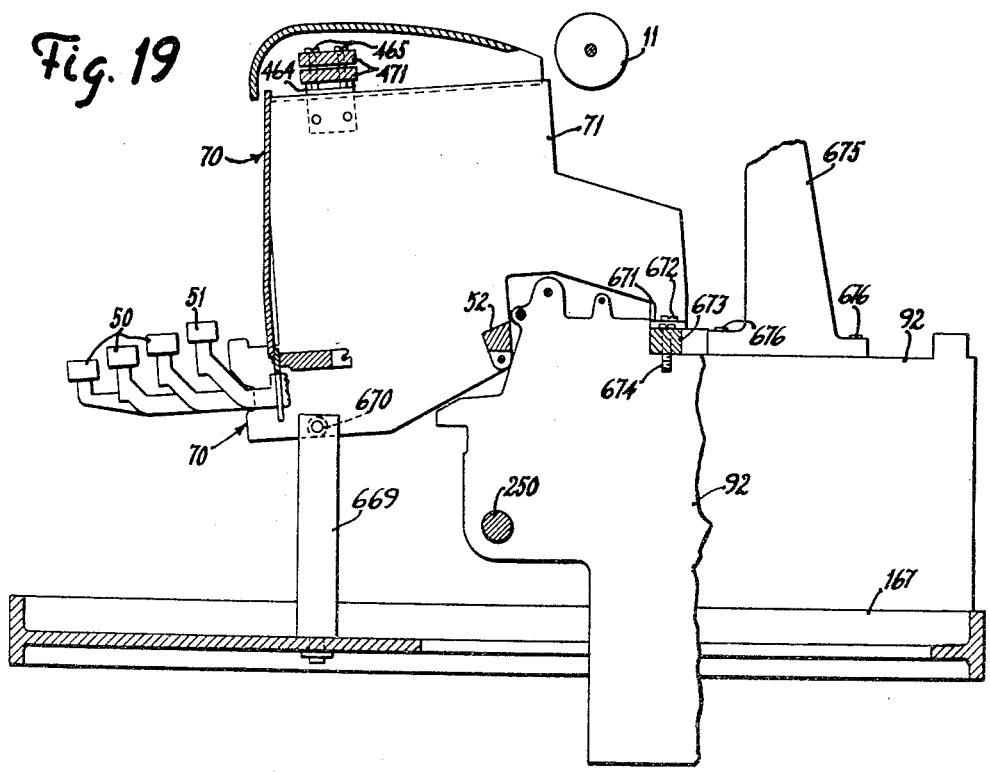
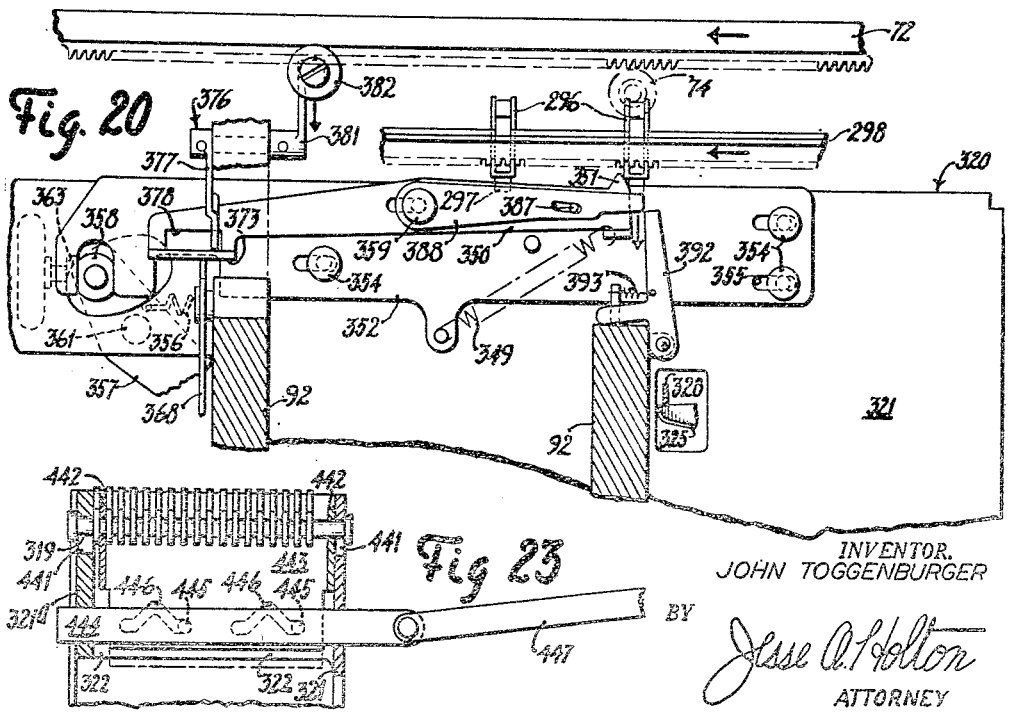
INVENTOR.
JOHN TOGGENBURGER
BY
Jesse A. Holton
ATTORNEY

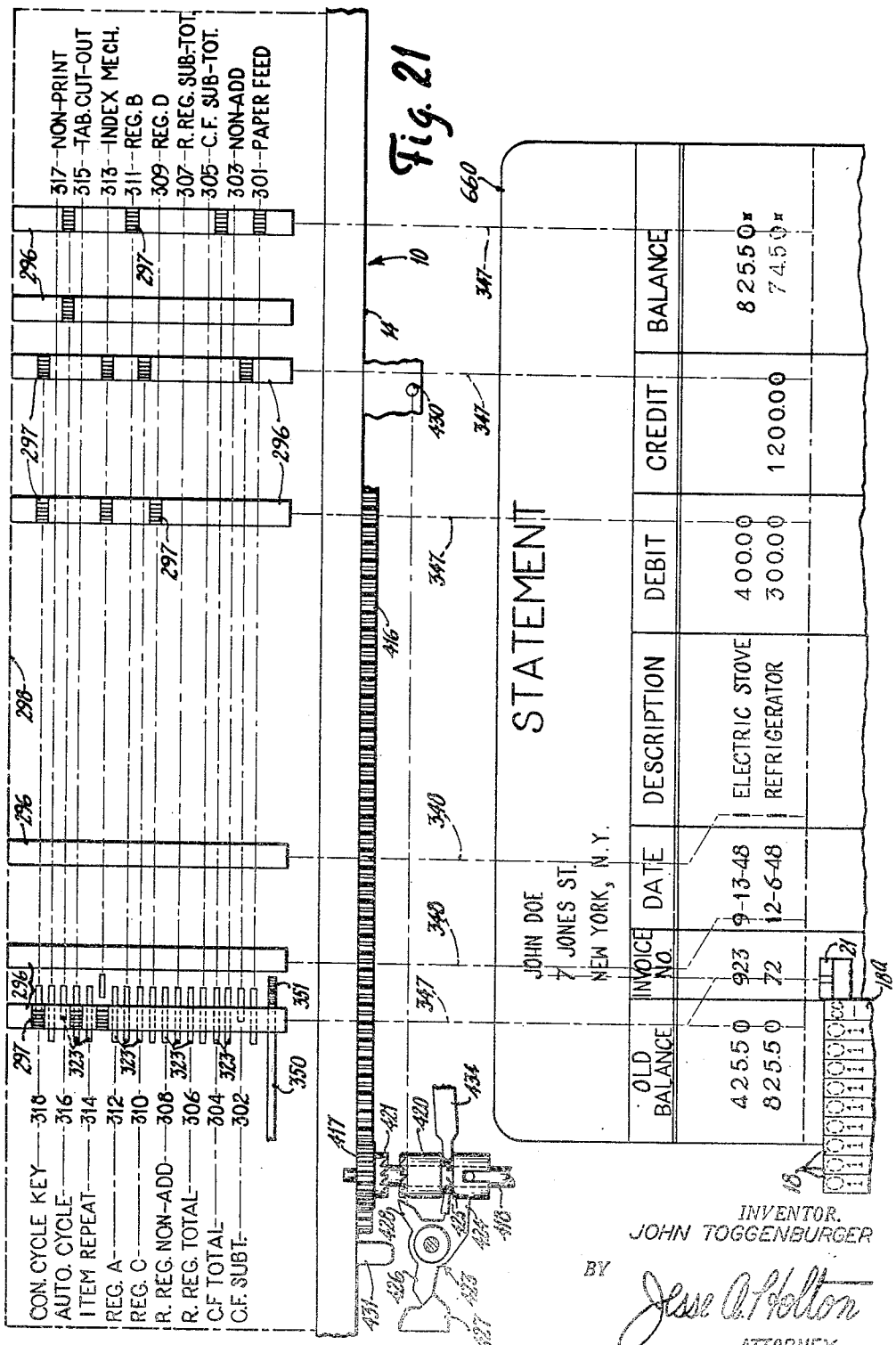

Patented Aug. 24, 1954

2,687,251

UNITED STATES PATENT OFFICE 2,687,251

PRINTING CONTROL MECHANISM FOR TYPEWRITER-COMPUTERS

John Toggenburger, Hartford, Conn., assignor to Underwood Corporation, New York, N. Y., a corporation of Delaware Original application December 21, 1948, Serial No. 66,441. Divided and this application November 2, 1951, Serial No. 254,485

16 Claims. (Cl. 235—60.31)

This invention is a division of a previously filed application, Serial No. 66,441, filed December 21, 1948. Said previously filed application is directed to features involving adding and computing mechanism, including amount recording means, in combination with typewriting facilities, whereas the invention featured herein is not necessarily used in conjunction with typewriting facilities, but pertains generally to any machine wherein a plurality of character imprints are effected by a series of adjacent, differentially positionable printing bars, for example such as are used in adding and computing machines. Some features of the invention are directed additionally to adding machine and computing machine features.

It is therefore one object of the instant invention to provide an improved printing mechanism of the kind embodying a series of differentially positionable printing bars as are used in adding and computing machines.

A more specific object of the invention is to provide efficient pressure printing facilities for machines embodying a series of adjacent printing bars.

Also an object of the invention is to provide efficient means to effect pressure imprints seriatim from a series of printing bars which are selectively positionable for character selection.

It is a further object to effect imprints quietly, in an efficient manner, by mechanism pressing seriatim the selected types against a platen, whereby the platen is subjected to a minimum of bending stress.

An important object of the invention is to provide for imprints off differentially adjustable adjacent printing members by rolling means moving across the front of such printing members to press them seriatim under high leverage condition and with a minimum of noise and shock into printing contact with record material.

A further object of the invention is to provide printing bars or members which have the digit types spaced therealong sufficiently far apart to assure separate distinct digit imprints against the record material, to provide additionally register actuators related with said printing bars and having smaller operating strokes than said printing bars, thereby to facilitate use of small-diameter registers, and additionally to provide efficient motion increasing gear connections between said actuators and said printing bars, preferably arranged to allow the latter, after digital positioning, to be actuated efficiently about the locations of the gear connections against the record material.

Also an object of the invention is to operate differentially printing members, such as adding machine printing members, under maintenance of considerable clearance from the front of a platen, then to move collectively such printing members nearly or lightly into contact with the platen, and thereafter to press the types seriatim against the platen for quiet and efficient printing.

It is a further object of the invention to provide in association with adding or computing machine printing bars, efficient means to move in any printing cycle those printing bars below a printing level which are to the left of the leftmost one that has become differentially actuated above zero position, in other words, to lower the printing bars which are not required to be active in printing an amount.

It is also an object of the invention to provide efficient means to lower in all printing cycles, below zero printing position, those printing members which are to the left of the leftmost one which is rising to a significant digit position, and to lower in total printing cycles wherein the total printed is zero, less than all printing members below zero position, whereby to cause in total printing operations the printing of the significant digits of the total, and in case the total is zero, the printing of some zeros.

It is an object also to provide reliably operative, efficient, key-responsive power indexing devices for setting up the numerical values of the computing mechanism of the machine.

A further object is to provide efficient carriage control means whereby machine cycles will institute automatically columnar tabulating movements of the carriage but only if the carriage has moved to particular columnar positions.

A still further object is to provide in conjunction with a column tabulating mechanism capable of actuation by the machine cycling mechanism, a carriage controlled mechanism to disable the tabulating mechanism whenever the carriage moves to a certain columnar position.

The noted objects are embracive of only some of the many features of the invention and additional objects will readily be perceived from the description hereinafter following.

The machine of the invention embodies to a large degree mechanism of the standard Sundstrand Class C accounting machine, as generally exemplified in the patent to Sundstrand No. 2,194,270, dated March 19, 1940. In regard to the typewriting mechanism, use has been made of much of the mechanism contained in the Underwood All Electric typewriter recently placed on the market.

Figure 3:
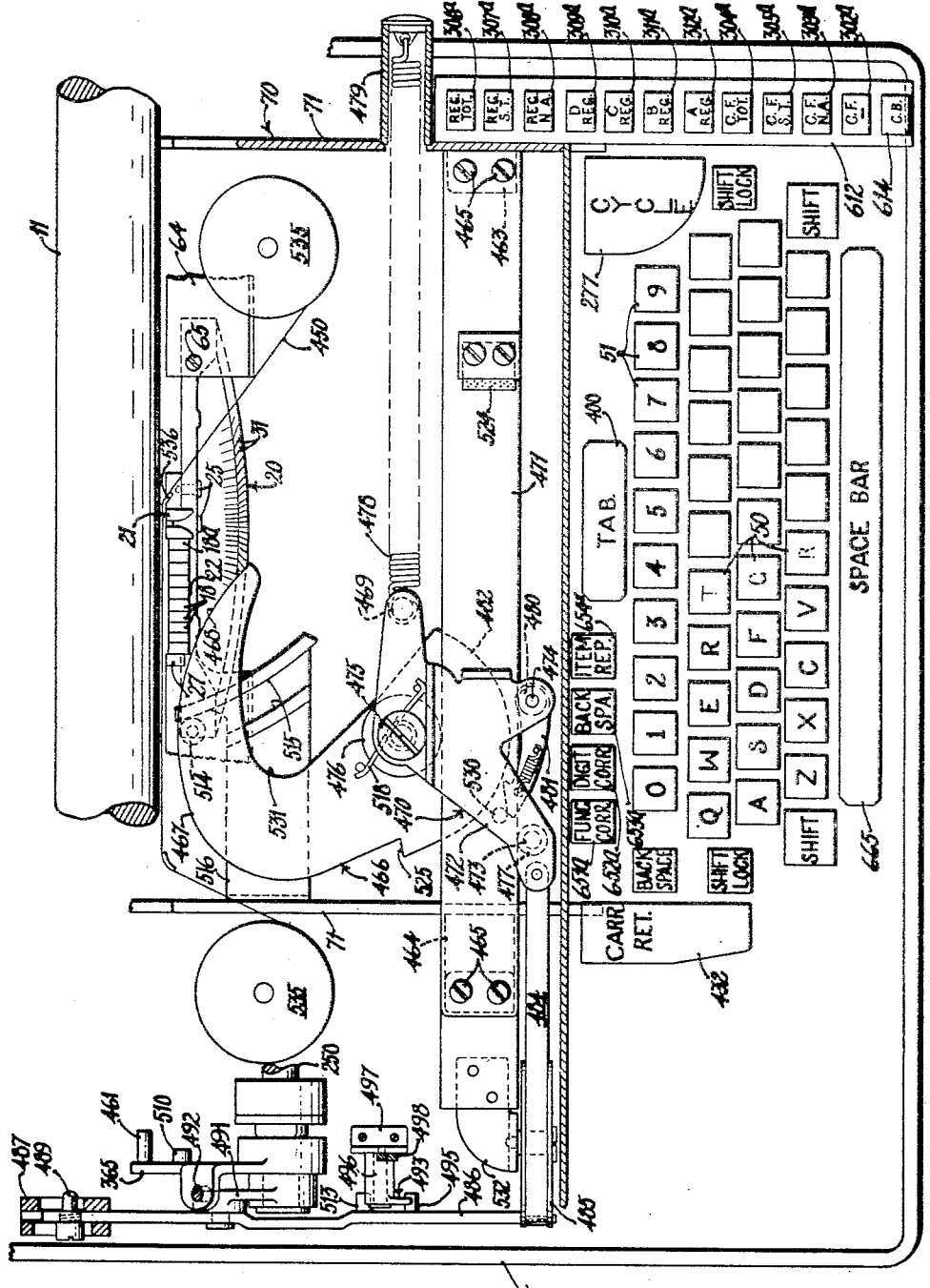
Figure 4:
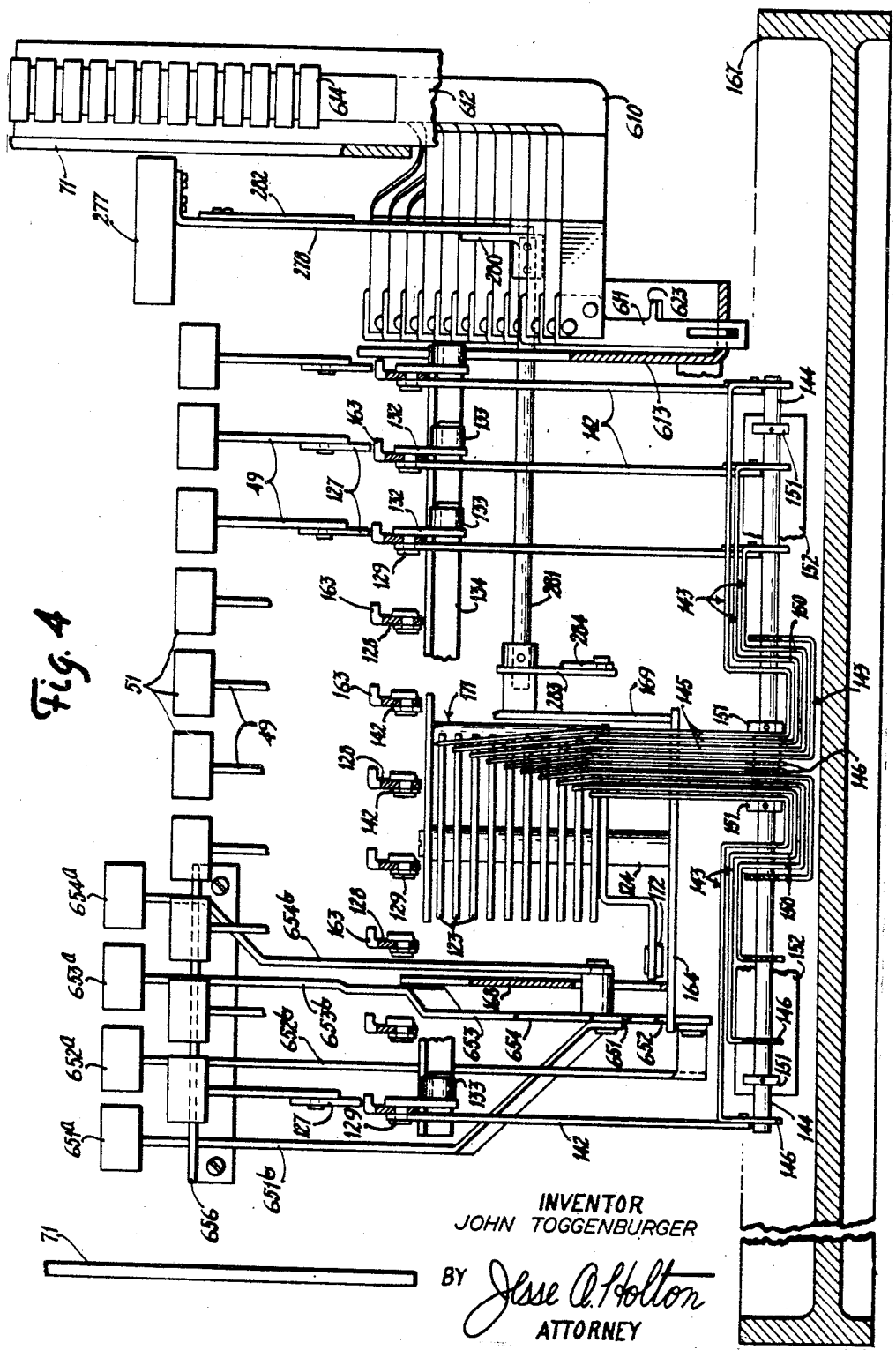
Figure 5:
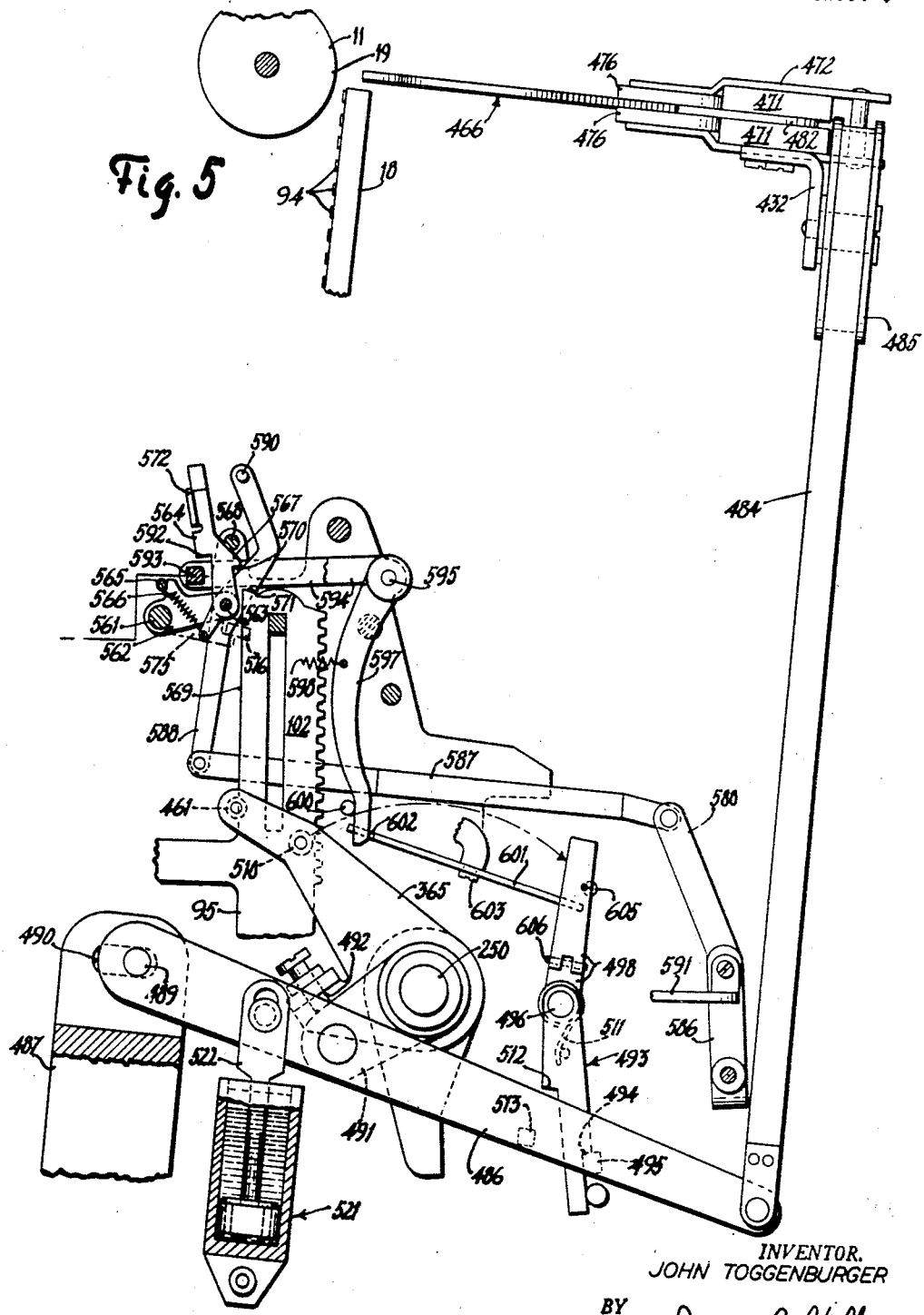
Figure 6:
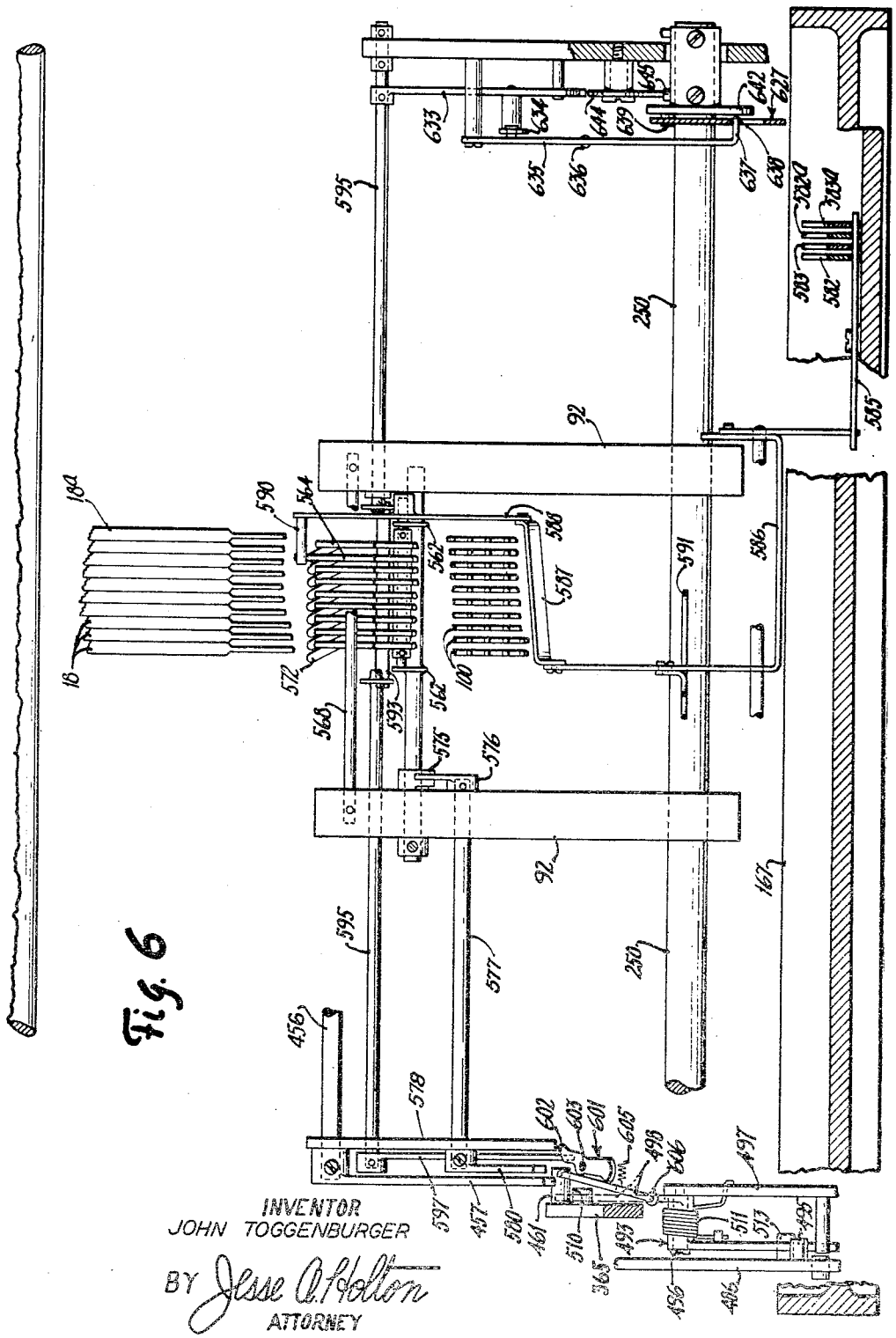
Figure 7:
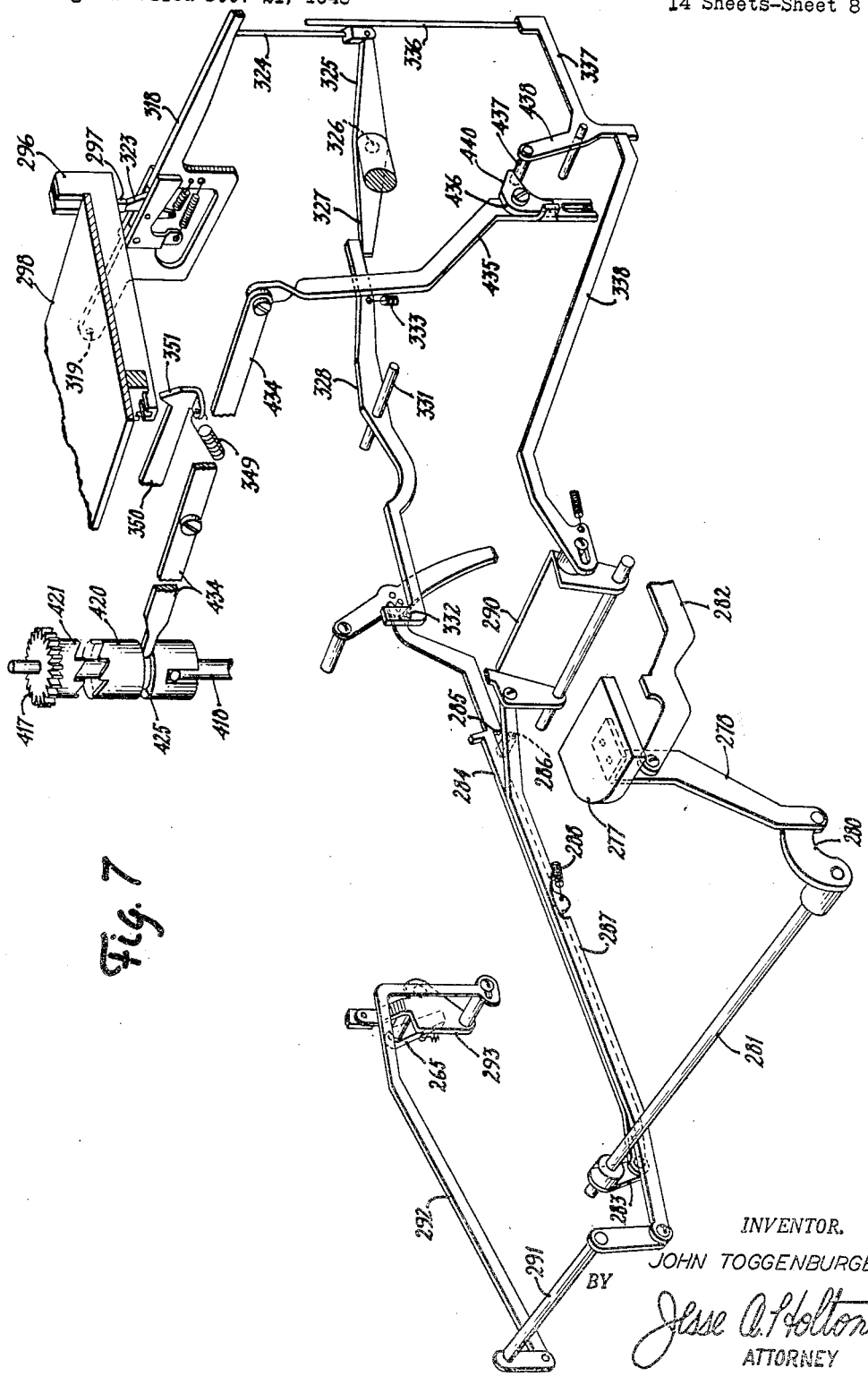

Turning now to the drawings:

Figures 1 and 1A, matched together along the vertical dot and dash lines in each of these figures constitute a sectional, left-hand side elevation of applicant's composite typewriting and printing computing machine, Figure 2 is a sectionally front elevation showing a typewriter segment with an upwardly projecting type guide and a set of computing machine printing bars located adjacently to the type guide, Figure 3 is a plan view, showing the keyboard of applicant's composite machine, and showing additionally a mechanism for pressing adding machine type bars seriatim against a platen and thereby effecting imprints, Figure 4 is a fragmentary front view showing some of the keys seen in Figure 3, and particularly a set of digit keys and some control keys, together with operative control trains leading therefrom, Figure 5 is a fragmentary left-hand side elevation, depicting the imprint effecting mechanism shown in Figure 3, and additionally a mechanism whereby imprints will be restricted to printing bars of significant orders. The view additionally shows a mechanism whereby the imprint effecting mechanism is controlled to operate only if at least one printing bar rises to a significant position, Figure 6 is a fragmentary front elevation showing some of the mechanism also seen in Figure 5, Figure 7 is a perspective view from the right front side of the machine looking down upon cycle instituting and related mechanism, Figure 8 is a plan view of the imprint effecting device seen in Figure 3, in a position of readiness for action upon the adding machine printing bars, Figure 9 is similar to Figure 8, but shows the imprint effecting device in an intermediary stage of action, Figure 10 is similar to Figures 8 and 9, but the imprint effecting device has done its work and is about to return to normal position, Figure 11 is a sectional front view of portions of a mechanism for rendering the digit keys potentially operative either with respect to the typing or with respect to an amount set-up or indexing mechanism, Figure 12 is a left-hand side elevation showing the mechanism of Figure 11, and including a manually settable controlling device set for the digit keys to serve in amount indexing capacity.

Figure 12:
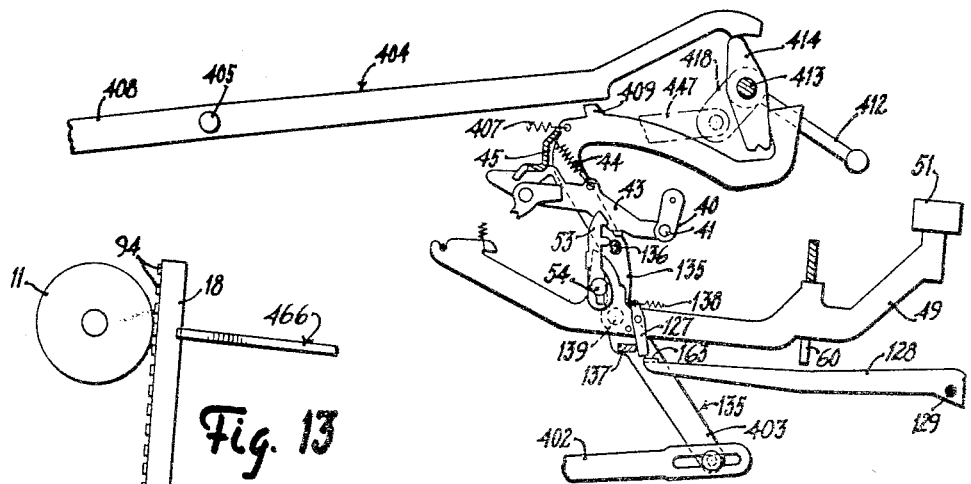
Figure 13:
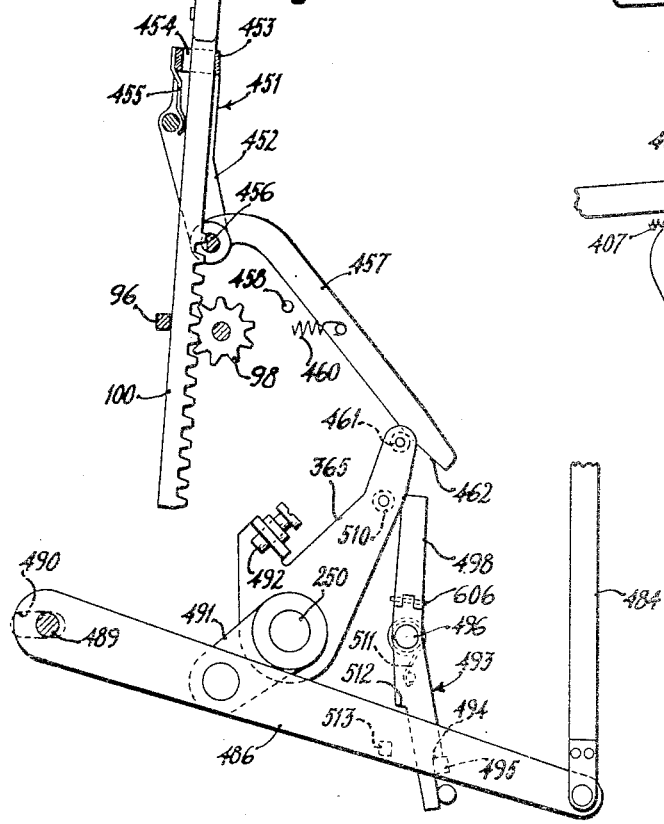
Figure 14:
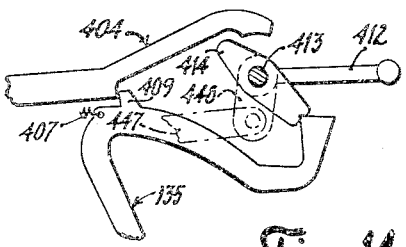

Figure 13 is a left-hand sectional view depicting a mechanism to move the printing bars collectively nearer to the platen preparatory to the imprint effecting means coming into action, Figure 14 shows the manual control device of Figure 12 set so that the digit keys are in control of the typewriting instrumentalities.

Figure 15 is a fragmentary right-hand side elevation depicting certain function control keys and showing also a blank-cycle enforcing mechanism, Figure 16 is a sectional front elevation taken substantially along lines 16—16 of Figure 1A, and showing a carriage tabulating mechanism in a normal condition in which the carriage is under control of a letter-feed escapement, Figure 17 is a view similar to Figure 16, but the carriage tabulating mechanism has been operated and the carriage is in the process of executing a tabulating movement, Figure 18 is a frontal, fragmentary sectional view showing a special selector as having been carriage actuated, to render the digit keys controlling with respect to the adding machine indexing mechanism, Figure 19 is a diagrammatic right-hand sectional representation of the framework supporting the typewriting and the adding machine instrumentalities, Figure 20 is a front sectional view similar to Figure 17, but with the tabulating mechanism ready to assume normal condition at the end of the tabulating run, Figure 21 is a representation of a work-sheet together with a diagrammatic representation of a set of control dogs therefor, Figure 22 (on sheet with Figure 1) is a plan view of a conventional machine cycling drive, and Figure 23 is a fractional side elevation of a mechanism to incapacitate the function selectors of the machine.

The description of the invention hereinafter following is divided under the following headings:

1. Work-Sheet Supporting Carriage
2. Typewriting Mechanism and Adding Machine Printing Bars
3. Letter-Feed Mechanism for Work-Sheet Supporting Carriage
4. Computing Mechanism and Printing Means Controlled Thereby
5. Crossfooter and Operating Means Therefor
6. Rear Registers
7. Machine Cycling Means
8. Cycle Key
9. Cycle and Other Function Controls by Carriage and Keys
10. Carriage Tabulating and Returning Mechanism
11. Automatic Control Means To Condition Digit Keys for Typewriting or Amount Indexing
12. Manual Control To Condition Digit Keys for Typewriting or Amount Indexing
13. Incapacitation of Function Control Selectors for Typewriting
14. Imprint Effecting Means for Computing Machine Printing Bars
15. Means To Provide for Imprints of Significant Order Only
16. Zero Total Signified by Printing of Two Zeros
17. Means To Prevent Idle Operation of Imprint Effecting Means
18. More on Function Control Keys
19. Blank Cycle Enforcing Means
20. Other Control Keys
21. Main Assembly Units
22. Work Example
23. Conclusion

1. *Work-sheet supporting carriage*

Referring now more particularly to Figures 1 and 1A, there is shown a work-sheet supporting carriage 10 having turnably mounted therein between two carriage ends 12, a paper-supporting platen 11. The carriage comprises also front and rear guideways respectively numbered 13 and 14, such ways connecting the two carriage ends 12 rigidly. To facilitate lively letter-feeding movement, the carriage is largely built of light-weight materials. Cooperative with two guideways 13 and 14 to the end of guiding the carriage by the intermediary of anti-friction elements 15, there is provided a stationary rail structure 16.

2. *Typewriting mechanism and adding machine printing bars*

The carriage 10 with its platen 11 is common to a set of typewriter type bars 17 and a group of adding machine printing bars 18 and 18a, the bars 18 being digit printing bars and a bar 18a having signal types. The typewriter type bars 17 are pivotally mounted upon a segment 20 to print at a common typewriting point 19 that is situated above a type guide 21. The adding machine printing bars 18 and 18a are normally retired below the said typewriting point and are as a group preferably directly adjacent to the left of the type guide, see Figures 2 and 3. The type bar segment 20 is generally of conventional design, but occupies a position sufficiently forward of the platen to afford operating space for the printing bars 18 which are directly in back of the segment and normally somewhat in front of the platen, the segment 20 having preferably a clearance cut as at 22 for accommodating it as closely as possible to the platen. Since the segment has a more forward position than is customary in conventional typewriters, typing heads 23 on the type bars are correspondingly carried thereon in more projecting relations of approach towards the platen. All type bars have at their heads a lip 24 for guiding entrance in the type guide 21 as each type bar approaches its printing position. The type guide 21 is very close to the front of the platen 11 and is secured to the rear of the type bar segment 20, as at 25. The guiding lips 24 in cooperation with the type guide 21 assure that the typing impressions are made at the exact location of the typewriting point 19.

The adding machine printing members 18 are confined as a group between the left side of the type guide 21 and a guide element 27 reaching upwardly from the segment 20, see Figures 2 and 3.

The various type bars 17 are guided in slots 31 of the segment 20 which converge directly below the type guide 21. The various type heads 23 and their guiding lips 24 approach the platen in upright relation, as is conventional in typewriters. A type bar in typing position is indicated in dot and dash lines, in Figure 2.

The operating mechanism for the typewriter type bars 17 will now be described, and it is to be observed that in the main this mechanism is like that disclosed in the patent to Yaeger, No. 2,254,764, dated September 2, 1941.

In the swinging plane of each type bar 17 lies a bell crank 32 which by a push link 33 has an operative connection with the type bar. All said bell cranks 32, and all said links 33, are identical. The bell cranks 32 are pivotally supported in an arcuate bar 34 which for the purpose has radial guide slots and which carries an arcuate pivot wire 35 common to all the bell cranks. Forwardly of the bell cranks 32 there is pivoted on a straight fulcrum wire 36, a set of upright levers 37, individually swingable forwardly and each connected by a link 38 to an upreaching arm of one of the bell cranks 32. The upright levers 37 are of graded lengths, exactly as in the said patent to Yaeger, No. 2,254,764, and have each a rolling face 40. A pendant lever 41 lies directly to the rear of each rolling face 40 for rolling contact therewith. The arms 41 are pivotally carried on a bar 42, in a straight row and have each pivotally connected thereto, in a rearwardly reaching relation, a type action driving link or actuator 43. The rear of each actuator 43 is urged upwardly and rearwardly by a spring 44, against the bottom of an angle bar 45, so that a snatch pawl 46 thereon is normally clear of a constantly rotating toothed power shaft 47, the latter being common to all the snatch pawls. The actuators 43 and the snatch pawls lie in a row extending parallel to the power shaft 47.

The said snatch pawls 46 are selectively connectable, transitorily with the power shaft 47 by imparting to the actuators 43 downward displacement about their pivotal connections with the arms 41. The selective connections are effected under control of a set of alphabet and digit keys respectively numbered 50 and 51. Said keys are on levers 49 which are pivoted to the rear of the power shaft 47 in a slotted bar 52, and which have each, pivotally carried thereon, as at 54, in upreaching relation a link 53 having a hook-end normally posed over a lateral protuberance 55 of the actuator 43. The links 53 have capacity for some rearward displacement about said pivots 54 against the tension of light springs 56, the normal position of each link with respect to its associated key lever 49 being established by contact therebetween, as at 57. Near their front ends the key levers 49 are vertically guided in slots of a comb plate 60. Springs at the rear urge the levers 49 upwardly to their normal positions seen in Figure 1.

It will thus be seen that by selective operation of the keys 49 a desired actuator 43 will be drawn down for association of its snatch pawl 46 with the power shaft 47, and that consequently such actuator will become power operated forwardly and will through rolling action of the arm 41 on the lever 37 operate the appropriate type action.

Normally the segment 20 and the arcuate bar 34 are located in a lower case position, as shown in Figure 1, so that the lower case type (the type nearer the type bar pivot) will swing to the printing point 19. A case shift mechanism, not shown, is provided to give, when desired, the segment 20 and the bell crank supporting bar 34 a lower position wherein the upper case types will swing to the typewriting point 19. The segment 20 and the arcuate bar 34 constitute a unitary movable case shift structure and to this end the arcuate bar at each side of the type bar system has a rearward reach as at 63, see Figure 1, and affords a flange 64 at each side of the segment to secure the latter thereto, as by screws 65, see Figures 1, 2 and 3. Said case shiftable structure is guided for case shift movement substantially in the plane in which the group of adding machine printing members 18 lie. The direction of case shift is indicated in Figure 1, by the showing of a ball and raceway at 66. It is to be understood that the points of connection of the links 38 with the rolling levers 37 and the bell cranks 32 are located to provide for similar type bar actuation while typing in either type case.

The snatch pawls 46 are disconnected from the power roll at desired points in each operating stroke. This is accomplished under control of abutments on a bar 67, which are encountered by cam faces provided on the underside of the actuators 43 just in front of the snatch pawls.

The described typing mechanism differs from the one disclosed in the patent to Yaeger, No. 2,254,764 only by the inter-positioning of the bell cranks 32 and the links 33 between the links 38 and the type bars 17. This change was made in order to have the operating connections for the type bars 17 forward of the type bar pivots and thereby to allow the positioning of the segment 20 as closely as possible to the adding machine printing bars 18 and the platen.

The typewriting mechanism just described is supported by a typewriter frame generally designated by the numeral 70 and comprising two spaced side walls 71 which are rigidly connected by the aforedescribed bars 42 and 52, as well as other bars.

3. Letter feed mechanism for work-sheet supporting carriage

Referring to Figure 1, the carriage 10 has supported thereon a letter feed rack 72. Supported on the typewriter frame 70, in a manner not shown, is an escapement wheel 73 carrying a pinion 74 normally in mesh with said rack 72. The rack 72 has teeth at letter-feed intervals and is releasable from the pinion 74 at will for repositioning the carriage. Accordingly, the rack is carried at opposite ends of the carriage, by arms 75 having finger pieces 76 extending upwardly therefrom to swing the rack above the pinion 74. Springs 77 associated with the arms 75 maintain the rack 72 releasably in mesh with the pinion 74. The carriage is constantly urged in letter-feed direction, that is, leftwardly, under the tension of a conventional carriage feed spring generally indicated at 78, see Figure 1A. However, a letter-feed escapement 80 associated with the escapement wheel 73 exercises normal control over the carriage to hold it in whatever letter-feed position it may be positioned. This escapement may be the same as is commonly used in the standard Underwood typewriter and is rockable by operation of each type action to feed the carriage one letter feed step. Namely, each of the bell cranks 32 is adapted to operate an arcuate universal bar 81, giving the latter a short movement of translation forwardly. The universal bar 81 includes two rearwardly reaching bars 82 which at their rear are supported and articulated upon spaced, upreaching arms 83 of a rocker frame having an axis at 85. A downreaching arm 84 of the rocker frame is operatively communicative with the escapement 80 by means of a link 86. The rocker frame axis 85 case shifts unitarily with the segment 20. The universal bar 81 and its associated parts are spring restored. The curved universal bar 81 is nested closely to the front of the arcuate bar 34 and has one or more guiding pins 87 extending thereinto. From the above it will be seen that each power operation of a type bar 17 will be accompanied by a transitory operation of the universal bar 81 and that the carriage consequently will execute a letter-feeding step following each typing impression made by one of the type bars 17.

4. Computing mechanism and printing means controlled thereby

The adding machine printing bars 18 are lightweight in structure and each has along its rear side a row of digit types 94, the uppermost type on each type bar being a "0" type and those below being progressively of higher digits. The printing bars 18 abut each other normally at least down to the point of the lowest type 94, and as a group are contained individually slidable lengthwise between the type guide 21 and the member 27, as before stated. Each printing bar 18 may be caused to rise differentially under control of an adding machine mechanism which in its major respects is identical with the conventionally marketed Sundstrand Class C accounting machine, disclosed in the above mentioned Patent No. 2,194,270. Specifically, the machine comprises for each of the adding machine printing bars 18 a differential actuator 95, all of which are guided for vertical movement in a usual manner, at the top by a bar 96, and at a lower level by a bar 97, these bars being notched to space the actuators laterally. The bars 96 and 97 extend between and are carried fast on two usual spaced frame members 92 of the adding machine framework, see Figures 1, 2, 9 and others. The printing bars 18 are of reduced thickness below the types 94 to intersperse them with the differential actuators 95, each printing bar having its associated actuator closely to the right thereof. Motion is transmitted from each differential actuator 95 to its associated printing bar by motion multiplying means, preferably comprising a relatively large gear 98 in mesh with a gear-rack 100 on the lower end of the printing bar 18, and a smaller gear or pinion 101 in mesh with a rack 102 formed on the differential actuator 95, the two gears being united for rotation together. The several pairs of gears 98 and 101 are turnably supported in a row on a fixed supporting rod 99 as shown n Figure 2. The differential actuators are structurally very similar to those shown in Sundstrand Patent No. 2,194,270 but are ending just above the supporting bar 96, whereabove in said patent they carry digit types that are individually hammer actuatable thereon. Due to the provision of the gears 98 and 101 the movements of the printing bars 18 are enlarged with respect to the movements of the differential actuators 95, for which reason the types 94 can be spaced widely enough along the bars to give always clear, individual typing impressions when moved rearwardly, into printing engagement with the platen. On the other hand, the type selecting differential movements of the bars 95 are relatively small, making it feasible to build an adding machine mechanism of relatively small proportions. The various actuators 95 have each an individual lifting lever 104 associated therewith by a pin and slot connection, as shown, each lifting lever 104 being under constant tension of a lifting spring 105. In the normal condition of the machine, however, a universal bar 106 overlies these levers 104 so that the actuators 95 and the printing bars 18 are positioned lowermost as seen in Figure 1. During each machine cycle the universal bar 106 rises and the springs 105 associated with the levers 104 will cause the actuators 95 and their associated printing bars to rise differentially, as called for by a particular item entry or by a total printing operation, the mechanism employed for this being in many regards the same as in said Patent No. 2,194,270.

An amount indexing mechanism, generally designated by the numeral 107, see Figure 1, controls the differential rise of the actuators 95 for item entries. This indexing mechanism includes a conventional bed of stops, comprising a plurality of adjacent vertical rows of stop pins 108, each vertical row containing 10 pins, representative, beginning from the bottom upwardly, the digit values from "0" to "9," and there being as many adjacent rows of pins as actuators 95.

At the rear of the bed of pins 108 there are arranged in a transversely movable carriage 111 a series of adjacent tail pins 112 which are slidable in vertical perforations therein. Normally said carriage is located so that the rightmost pin 112 is a short space to the left of the bed of pins 108. Each tail pin 112 has extending through a perforation at the bottom thereof a forward extension 113 of one of the actuators 95, the various extensions 113 having hinged association as at 114 with their related actuators. The tail pin carriage 111 constitutes a denomination shifting carriage and is slidably supported on a transverse rod 115 in the machine.

Progressively beginning with the leftmost row, index pins 108 are set in accordance with the digit value to be represented. For this purpose there is articulated with the denominational carriage 111, as at 117, the rear end of an arm 118 that is fulcrumed on a vertical pin 120 to swing horizontally. The arm 118 carries an upright post 119 near the rear end thereof, wherethrough there extends a vertical row of push rods 121 for setting the index pins 108. These rods are adapted to swing with the arm 118 progressively into operative alignment with the several rows of index pins 108. Before commencing to index an amount in the bed of pins 108, the push rods 121 are directly in front of the leftmost row of index pins 108. In a manner to be explained later, the push rods 121 are selectively operated to index one index pin first in the leftmost row. Thereupon the denominational carriage 111 moves rightwardly one step to place the rightmost vertical tail pin 112 in alignment with the first row of pins 108. Another selective operation of the push rods 107 may then be effected, and being that the push rods 121 are then in alignment with the second row of pins 108, a pin will consequently be set in this row. There follows another denominational shift of the carriage 111, as before, and the indexing operations may be repeated as required by the amount to be indexed. After the desired value has been indexed, the appropriate sensing pins 112 will have become positioned underneath the appropriate rows of set index pins 108, ready in a cycle to limit the upward movement of the actuators 95 and associated printing bars in accordance with the value represented by the set pins.

Referring to Figure 1, the push rods 121 have pivotal connections, as at 125, with arms 123. The latter are all alike and are carried for individual horizontal swinging movement on a vertical stud 124 to actuate the rods 121 rearwardly. All said pivotal connections 125 lie substantially in a vertical line directly in line with the fulcrum pin 120 of the swinging arm 118. It follows, therefore, that the push rods 121 swing with the arm 118 and are operable by the arms 123 to index a pin 108 of whatever vertical row may be opposite it. The arms 123 are spring restored in a manner well known, to positions wherein the rear ends of the push rods 121 are clear of the bed of index pins 108, as shown in Figure 1.

A novel mechanism is provided to power actuate the push rod actuating arms 123 under control of the same digit keys 51 by which the numeral typewriting actions are called into operation. Referring to Figures 1, 11 and 12, the levers 49 which have the digit keys 51, carry each pivotally attached thereto a pendant element 127. Whenever the keys 51 are operated for typewriting numerals, said pendant elements 127 vibrate idly down and up with their associated key levers 49.

From Figure 1 it will be seen that in front of said pendant elements 127 there lie forwardly reaching levers 128 which at their front ends each carry pivotally a snatch pawl 130. The latter are normally below and clear of a toothed power roll 131 which, while the machine is in use, is constantly power rotated in the direction of the arrow. The said levers 128, see Figures 1 and 4, are supported upon pivot pins 129 provided on short arms 132 that are mounted and upreaching for forward swinging movement upon the lugs 133 on a stationary rod 134 in the machine. Whenever the keys 51 are to be operative for amount indexing operation, the draw links 53 for connecting the type action actuators 43 must be rendered inoperative and, conversely the pendant elements 127 must be brought into cooperative alignment with the rear ends of the levers 128.

To this end a unitarily pivoted structure is provided, which includes spaced side members 135 pivotally carried on studs 139 provided on the opposite side walls 71 of the typewriter, and which includes further an upper bar 136 and a lower bar 137 rigidly connecting said side members 135. When the digit keys 51 are to be operative for typewriting, the structure 135, 136, 137 is in the pivotal position seen in Figure 1. By means to be described later, the said pivoted structure is swung to the position seen in Figure 12 whenever it is required that the keys 51 be operative for amount indexing function in connection with the adding machine mechanism.

Observing from Figure 1, it will be seen that the pull links 53, by reason of the forward position of the rod 136, are normally in operative relation with regard to the typewriter actuators 43, and that the pendant elements 127, by reason of the position of the rod 137, are normally lying to the rear of the actuator levers 128, the springs 138 urging the pendant elements 127 to lean resiliently rearwardly against the rod 137.

In the position of the pivotal structure 135, 136, 137 shown in Figure 12, the rod 136 has displaced the pull links 53 rearwardly for incapacitation thereof about the pivot 54, while the rod 137 has swung all the pendant elements 127 into operative relation over the rear ends of the levers 128. Therefore when the digit keys 51 are selectively operated while the structure 135, 136, 137 is set as seen in Figure 12, the pendant elements 127 will rock the levers 128 selectively to engage the appropriate snatch pawls 130 with the toothed shaft 131, the rocked lever 128 consequently receiving bodily a power motion rearwardly, and the arms 132 being rearwardly swinging during such motion.

Operating trains lead from the pivot pin 129 on each arm 132 to the appropriate push rod operating arms 123 of the indexing mechanism.

These trains, see Figure 4, include identical links 142 articulated to the pins 129 and extending downwardly therefrom. With the exception of the two most centrally located links 142 in the machine, all these links are connected to bails 143 that are rockable on a stationary rod 144 and embody upreaching arms 145 individually associated with the various push rod operating arms 123. The bails 143 are variously shaped, as shown, reaching from their points of connection with the links 142 inwardly from opposite sides to provide the upreaching arms 145 in a cluster in front of the arms 123. All the bails 143 include a forwardly reaching arm 146 to which one of the links 142 is connected. From the two middle links 142, the motion to their associated push rod operating arms 123 is transmitted by two simple bell cranks, each including, as the said bails, an upreaching arm 145 and a forwardly reaching arm 146. All the arms 145 have an operating nose 147 directly in front of the appropriate arm 123, said noses being arranged relative to the various arms 123 at various arm lengths, preferably in an echelon arrangement as shown in Figure 4, in order that equal angular motion received by the various arms 145 will result in equal angular motions of the push rod operating arms 123. Some of the bails have intermediate web portions 150. This is to provide that the lateral order of the upreaching arms 145 is the same as the lateral order of the related links 142, and thereby to make possible said echelon arrangement of the noses 147.

The bail supporting rod 144 is carried on lugs 151 that project rigidly from a stationary cross bar 152 in the machine. Two of these lugs flank the cluster or array of upreaching arms 145 and, in conjunction with spacing washers between the various upreaching arms 145, determine the lateral positions of the latter, and, therefore, the bails 143.

The actuator levers 128 rest normally near their forward ends upon a stationary angularly shaped cross bar 156. This is under the urge of springs 157 which are anchored to the bar 156 and draw the levers 128 downwardly and forwardly. The normal positions of the actuator levers 128 may be indirectly determined through engagement of the bail and bell crank structures embodying the arms 145, with the lower front side of the bar 152.

As each of the actuator levers 128 is driven rearwardly by the power shaft 131, and as consequently, the index pins in the various tiers become set, each actuated actuator lever 128, by coaction of a cam face 160 thereon with an abutment screw 161, cams such actuator downwardly to separate its snatch pawl 130 from the power shaft 131. The abutment screws 161 are adjustably carried on a transverse bar 162 fastened upon the adding machine framework.

Each actuator lever 128 is preferably operated only once for each actuation of its associated digit key 51. To this end, see Figures 1 and 4, the rearward ends of the actuator levers 128 may have each a laterally projecting lug 163 for engagement by the related pendant member 127, each engaged lug 163 riding off the rear of the pendant members 127 as each lever 128 is being actuated. Subsequently during the return of the actuated lever 128, the pendant member 127, if remaining operated, is idly displaced about its pivotal connection on the key lever 49 by said lug 163, wherefore the pendant member 127 can reassume its potentially effective position over said lug 163 only after a restoration of the digit key. The snatch pawl 130 has capacity for some limited pivotal motion on the actuator 128 to the end of assuring a full engagement with the power shaft 131.

A structure, which in the standard Sundstrand machine hereinabove noted houses a group of 10 digit keys, is retained in the present composite machine, although these keys are replaced by the keys 51. This is for the support of some old as well as new mechanism. Referring to Figures 1 and 4, this housing structure comprises a base plate 164 fastened as at 165, Figure 1, to the base frame 167 of the adding machine. It further comprises two spaced side walls 168, 169. The bars 134, 162, 156 are preferably carried by these side walls 168, 169. The bottom panel 164 has clearance perforations for some of the links 142 and some of the up-reaching arms 145.

Upon each successive indexing operation effected under control of a key 51, the denominational carriage 111, see Figure 1, executes a denomination shifting step to the right as seen from the front of the machine. Referring to Figures 1 and 4, this is done under control of the push rod actuating arms 123 in a usual manner, through operation of a universal bar 171 that is pivoted coaxially with the arms 123 and which has connection by means of a link 172 with a usual escapement device 173, the denominational shifting carriage 111 being urged to feed rightwardly under power of a spring, not shown.

A usual device, not shown, is provided at the left of the index pin bed to restrict the rise of all actuators 95 of insignificant order to rise only to "0" position. This device, as is conventional in said Sundstrand machine, is incapacitated during total printing operations, when it is desired that all actuators 95 be allowed to rise in accordance with the amounts to be total printed.

5. *Crossfooter and operating means therefor*

The differential actuators 95 have each a rearward extension 210 to each of which there is connected an adding rack 211 and a subtracting rack 212. A register 213, henceforth to be referred to as a crossfooter, inasmuch as it is capable of addition and subtraction, is arranged between the racks 211 and 212, and is adapted to be shifted horizontally into mesh with either the adding or subtracting racks, in the same manner as in said patent to Sundstrand No. 2,194,270.

The crossfooter 213 comprises a series of individual pinions 214 rotatively mounted upon a transverse shaft 215 that is shiftable rearwardly or forwardly to mesh the pinions 214 respectively with the adding racks 211 or the subtracting racks 212. The racks 211 and 212 are attached to the rearward actuator branches 210 by means of mounting studs 216 on said branches which reach through short vertical slots 217 in said racks. At the level of the crossfooter, in a usual manner, the racks 211 and 212 are guided in vertical slots provided on transverse bars 218. Contractile springs 220 associated with the racks, and anchored to downward reaches of the actuator branches 210, facilitated by the slots 217, permit, by means to be described, the arrest of the racks 211, 212, during their downward movement at the end of any machine cycle, one unit movement before the actuators 95. However, whenever a register wheel 214 is to receive a transfer movement, the rack 211 or 212 in mesh therewith is allowed to move with its associated actuator 95 the full distance, that is one unit movement in excess of the digit value to be printed, it being understood that the total return movement of the differential actuators 95 is always the equivalent of one unit movement in excess of an indexed digit or a digit to be total printed.

During an item entry cycle in which are crossfooter 213 is active, the crossfooter is shifted, forwardly or rearwardly as required, at the beginning of the second half cycle of the machine, to cause the racks 211, 212 during their subsequent descent to drive the crossfooter 213 either additively or subtractively. The means by which the racks 211, 212 are arrestable after a decent corresponding to the indexed number comprise pawls 221 engageable by lugs 219 on the racks. Whenever a register wheel 214 is to receive a units transfer from the wheel of the next lower order, a units transfer tooth 222 on such lower order wheel will trip a transfer control element 223 free from an edge of the bar 218 where it is normally held. These elements are pivotally carried on the pawls 221, and springs 224 keep them normally latched. Upon the freeing of any element 223, it will, under the tension of a spring 224, move the associated pawl 221 out of blocking position. In each instance where this occurs, the active rack 211 or 212 descends the full distance with the associated differential actuator 95, and will move the register wheel the equivalent of the indexed digit value plus a carry unit. In all instances where there is to be no carrying operation, the pawl 221 will remain in place under the rack lug 219, so that the springs 224 will be stretched after the racks 211 or 212 have become arrested.

6. Rear registers

As in said Sundstrand Patent No. 2,194,270, the present machine is shown to include four rear registers, designated A, B, C and D, arranged vertically above each other and capable of addition and total taking action, see Figure 1A. These rear registers are adapted to be engaged only one at a time inasmuch as a single set of drive racks 235 are common to all. Said drive racks are adapted to excute extra unit steps for effecting ordinal transfers similar to the crossfooter racks 211, 212. The racks 235 are mounted for vertical movement in transverse guide bars 236. At their lower ends the various racks 235 have articulations with arms 237 that are pivotally mounted on a rod 238 which constitutes also a fulcrum for the lifter arms 104 of the type bar actuators 95. Each of the arms 237 has a lost motion connection 240 with an arm 241 that constitutes together with the actuator lifter arm 104, a lever, said lost motion connection affording capacity for a one unit yield between the arm 237 and the arm 241. When the type bar actuators 95 move upwardly the racks 235 move downwardly. Springs 242 arranged intermediate the arms 241 and 237 permit the register driving racks 235 in their upward return movements to be arrested the equivalent of one unit movement ahead of the return movements type bar actuators 95. The usual units transfer control mechaanism is provided, which includes stop members 243 associated with the racks to suppress individually the last unit return movement of the racks 235 at all times except whenever a units transfer is to be received, the stop members being appropriately controlled for the purpose by transfer control teeth on the wheels of the active register A, or B, or C, or D, in a manner not shown.

The registers A, B, C, and D are selectively shiftable forwardly into mesh with the racks 235 in a usual manner, under carriage control, as well as under key control, some of the primary elements for such control being pointed out later.

7. Machine cycling means

The machine cycling means includes a rock shaft 250, see Figures 1, 2, 5, 6, 15 and 22, which, as viewed from the left side of the machine, as seen in Figure 1, receives in each cycle first a clockwise, then an anti-clockwise rocking motion, each of 90°. For imparting said rocking motion to the shaft, the machine includes, see Figure 22, a one-revolution cycling shaft 251 which carries a crank disk 252 having a connecting rod 253 linked to a downwardly reaching arm 254 on the rock shaft 250. During each cycle the disk receives one turn, and consequently imparts said reverse rocking motions to the shaft 250. Still referring to Figure 22, an electric motor indicated at 255 drives a shaft 256 continuously while the machine is in operation. Said shaft 256, by means of a worm 257 and a worm wheel 258, turns continuously a bushing 260 having a clutch member 261 unitarily rotatable therewith, the bushing 260 being concentrically arranged with the one-revolution shaft 251. Upon the shaft 251 is provided, longitudinally shiftable and keyed thereon, a clutch member 262 that normally is separated from the clutch member 261. A clutch shifter 263 under constant tension of a spring 264 tends to engage the clutch element 262 with the other clutch element 261. However, as indicated in Figure 22, the clutch element 263 is normally held separated from the other clutch element by a cycle instituting trip dog 265 which includes a cam face 266 to cam the clutch element 262 to open clutch position at the end of each cycle, and which includes also a shoulder 267 to stop and hold the clutch element 262 and its associated one-revolution shaft 251 against rotation in full cycle position. Tripping of the dog 265 free of the shiftable clutch element 262 causes the latter to engage the constantly rotating clutch member 261, and resultingly the shaft 251 and the crank disk 252 will receive a one cycle turn to impart a rocking motion to the shaft 250.

Referring to Figure 1, the rock shaft 250 carries at each opposite side of the group of type bar actuators 95 a member 271 having a cam roller 272 in controlling communication with a forked arm 273, the latter being pivoted on the same rod 238 which also pivotally supports the lift arms 104 of the actuators 95. These forked arms 273 support the rod 106 which overlies normally the lifting arms 104 for the actuators 95. In the normal condition of the machine, as seen in Figure 1, the forked arms 273 are held in their lowermost positions by the rollers 272. In each machine cycle after some initial rearward rocking motion is imparted to the members 271, the rollers 272, in control of said forked arms, cause the rod 106 to rise, permitting the actuators 95 to be lifted by the lifter arms 104, either in accordance with the prevailing condition in the bed of index pins 103, or in accordance with a total to be taken from the crossfooter 213 or one of the rear registers A, B, C or D. It is understood that the forked arms rise sufficiently to allow the printing bars 18 and 18a to rise to their highest possible digit positions. The forks in the arms 273 are designed so that the latter receiver their up and down motions respectively over the mid phases of the reverse rocking motions of the rock shaft 250. Always during the return rocking stroke of the shaft 250 the forked arms 273 are forced downwardly to place the actuators 95 in their lowermost, normal positions as viewed in Figure 1.

8. Cycle key

The cycle trip dog 265 may be tripped under control of a cycle key 277 shown in Figures 3, 4, 7 and 15, such key being preferably arranged at the right of the group of digit keys 51. As will be brought out later, the machine includes novel means whereby the cycle key 277 is effectively operable only while the paper-supporting carriage 10 occupies certain columnar positions. The cycle key 277 has a stem 278 pivotally connected at its lower end with an arm 280 fast on a rock shaft 281. To provide vertical guidance for the cycle key stem 278, its upper end has a pivotal association with a guide arm 282 which may be similar in form to the key levers 49 and may be pivoted in the same cross bar 52. The rock shaft 281 has near the left end thereof an arm 283, supporting a rearwardly reaching pull link 284, having a shoulder 285 normally positioned behind a square stud 286 on a link 287 which is in communication with the cycle tripping dog 265. A spring 288 associated with the pull link 284 serves to restore the mechanism leading to the cycle key to a normal position in which the key guiding arm 282 abuts the upper end of a slot in the key-lever comb 60. The link 287 is supported at the rear by a bail 290 and at the front by a bail 291, the latter having a link 292 extending rearwardly therefrom and articulated to an arm 293 which forms a unitarily pivoted structure with the cycle trip dog 265. Providing the paper-supporting carriage 10 is in a computing column and providing the machine is in full cycle position, which condition will be explained later, the shoulder 285 of the pull link 284 is posed behind the stud 286. Therefore, when the cycle key is operated with the machine in this condition, the shoulder 285 of the draw link 284 will displace the pin 286 forwardly and will consequently cause the cycle trip dog 265 to be tripped, thereby instituting a machine cycle.

9. Cycle and other function controls by carriage and keys

The machine of the invention has function control dogs 296 attachable to a plate 298 on the carriage in desired positions, see Figures 1A and 21. These dogs are generally of the design disclosed in said Sundstrand Patent No. 2,194,270, and, by means of appropriately located tappets 297 projecting downwardly therefrom, are adapted to operate, by movement of the carriage to certain positions, any one of a number of underlying, frame-supported, function selectors which are designated by the numerals 301 to 318, inclusive. All these tappets but those numbered 313, 315 and 318 serve in capacities which are conventional and disclosed in said patent to Sundstrand, No. 2,194,270.

A series of function control keys 302a to 312a, inclusive, are provided at the right of the typewriter keys 50, 51, see Figures 1, 3 and 15, for selecting manually the same operations as the carriage controlled selectors 302 to 312 do.

Said selectors and function control keys serve to condition the machine for the following functions:

| Selector | Key | |
|---|---|---|
| 301 | | Paper feed. |
| 302 | 302a | Subtraction in crossfooter. |
| 303 | 303a | Non-add in crossfooter. |
| 304 | 304a | Total in crossfooter. |
| 305 | 305a | Sub-total in crossfooter. |
| 306 | 306a | Total in selected rear register. |
| 307 | 307a | Sub-total in selected rear register. |
| 308 | 308a | Non-adding selected rear register. |
| 309 | 309a | Register D. |
| 310 | 310a | Register C. |
| 311 | 311a | Register B. |
| 312 | 312a | Register A. |
| 313 | | Adding machine indexing mechanism operative. |
| 314 | | Item repeat. |
| 315 | | Tabulation cut-out. |
| 316 | | Automatic cycle. |
| 317 | | Non-print. |
| 318 | | Cycle key conditioner. |

The various functions selectors 301 to 318, inclusive, comprise levers, all pivoted at their left ends on a rod 319 supported in a selector housing 320 normally in the elevation seen in Figure 1A, such housing including a front wall 321, a rear wall 321a and a connecting web 322. These levers or selectors include either a one-way or a two-way acting cam element 323 thereon for camming engagement during carriage advance by related overlying tappets 297 on the control dogs 296, such engagement resulting in downward actuation of the related selectors about said pivot rod 319. The right ends of the selectors are guided for vertical movement in a well-known manner, not shown. So far as it is thought necessary for an understanding of the invention, more will be said about some of these selectors as the description proceeds.

It has been stated that the cycle key 277 is effectively operable only in certain columnar positions of the carriage 10. To this end, see particularly Figure 7, as the carriage advances into any computing column, a tappet 297 on a function control dog 296 related with such column rides upon and depresses the one-way acting cam element 323 of the selector 318 and thus causes the latter to be depressed. Underlying said selector 318 near its right end is a rod 324 which at its lower end is articulated to a lever 325 having pivotal support at 326 and having a left end 327 underlying the rear end of a lever 328. The latter has forwardly of a pivot rod 331 therefor, a pin 332 reaching laterally under the rear portion of the pull link 284 of the aforedescribed cycle-instituting mechanism. A spring 333, associated with said lever 328, constantly urges the pin end of the latter to lift the pull link 284, thereby to position the shoulder 285 above the stud 286. It follows therefore that the shoulder 285 is in cooperative alignment with the pin 286 only in the event a computing column is in registration with the set of printing bars 18, that is when a tappet 297 has depressed the selector 318 and resultingly has lowered the shoulder 285 behind the stud 286, as illustrated in Figure 7. The machine can thus only be cycled under control of the cycle key 277 if the carriage is stationed in a computing column.

For instituting automatic machine cycles the machine may include a usual cycle instituting selector 316, see Figure 1A. This selector is operated in approach of any desired carriage position by provision of an appropriate tappet 297 on an appropriately located dog 296. Said cycle selector 316 overlies a rod 336, see Figure 7, which by a bell crank member 337 and a link 338 is operative on the bail 290 to which the link 287 leading to the cycle trip dog 265 is articulated. It follows therefore that the cycle trip dog 265 is operable under carriage control through operation of the selector 318. Cycles for obtaining totals from the various registers in the machine are preferably instituted under carriage control by operation of the selector 317.

10. Carriage tabulating and returning mechanism

In order that the letter-feed mechanism for the carriage 10 may be in readiness to serve whenever the typing instrumentalities are operated, a tabulating mechanism is provided which normally is not in control over the carriage, and which after being called into operation and after functioning will restore automatically the carriage to the control of the letter-feed mechanism. The normal state of this tabulating mechanism is seen in the front sectional illustration of Figure 16. This mechanism comprises a tabulator stop lever 350 having a stop nose 351 normally below the path of travel of the function control dogs 297, the lever being urged to the normal position seen in Figure 16 under the urge of a spring 349. From said figure, it will be noted that the carriage feed rack 72 is normally in mesh with the escapement pinion 74, and that thus the carriage is normally stationary under control of the letter-feed escapement 80. The position in which the carriage feed rack 72 and the function control dogs 296 are shown in Figure 16 is that which has resulted from a tabulating operation in which the function control dog 296 shown directly under the escapement pinion 74 was controlling. Said tabulator stop lever 350 is pivoted between its ends upon a stud 359 which is carried by a plate 352 having limited capacity for sliding movement on the front wall 321 of the selector housing in the direction of travel of the carriage 10. Said capacity for sliding movement of the plate is provided for by headed pins 354 in said wall 321 in conjunction with slots 355 in said plate. Normally said plate 352 is in a rightward limited position provided by said slots 355, it being urged to such position under the tension of a spring 356 which is active on a lever 357 having association therewith. Said lever 357 is mounted on a stationary pivot pin 361, and has a pin provided with a surrounding bushing 358 extending into a notch 360 of the slide. A dashpot device 362 is connected to the lower end of the lever 357, thereby to impede leftward movement of the slide 352. By reason of the described mechanism the stop lever 350 softly intercepts the carriage at the end of each tabulating run. A final padded stop 363 for engagement by the bushing 358 limits leftward movement of the plate 352 and thus the lever 350.

Cycle-actuated means is provided to rock the tabulator stop lever 350 automatically to the position seen in Figure 17, wherein its stop nose 351 lies in a tabulation stopping path of a function control dog 296 to the right thereof. This means is cycle-actuated during the return rocking motion of the cycle shaft 250, and, see Figures 1 and 1A, comprises an arm 364 rigidly associated with the cycle rock shaft 250 and having a link 366 reaching horizontally to the rear thereof. The rear of this link 366 is connected with a bell crank 367, having a stationary pivot, and having upwardly extending therefrom a link 368 formed with a hook 370. A light spring 371 biases the link 368 to bear rearwardly against a stud 372. Normally the hook 370 is positioned below and in front of a ledge 373 on the tabulation stop lever 350. During the first half of the machine cycle when the rock shaft 250 turns clockwise as seen from the left side of the machine, the hook link 368 will rise until its hook end snaps over the ledge 373. This is indicated in dot and dash lines in Figure 1A. During the second half cycle when the shaft 250 rotates back to normal position, the hook 370 will pull down the left end of the tabulator stop lever 350, wherefore the stopping nose 351 will rise into tabulation controlling range with the function control dog 296 situated to the right thereof. Near the end of the return stroke of the cycle, the hook link 368 will be displaced forwardly by engagement of a cam face 374 thereon with the stud 372. However, means are provided which automatically function to maintain the tabulator stop lever 350 in operated position until its nose 351 in conjunction with an approaching control dog 296 has caused the tabulation to be concluded. This will be described a little further on.

Incidental to each operation of the tabulator stop lever 350, the carriage is freed for tabulating movement by the carriage feed spring 78. This is done through a lever 376 comprised of an arm 377 reaching into a slot 378 of the tabulator lever 350, and another arm 381 reaching oppositely under the carriage feed rack 72 and having a roller 382 underlying a bottom face 383 thereof, the two arms 377 and 381 being rigidly connected by a short shaft 384 having pivotal support in the left one of two carriage rail supporting legs 675. Except when a tabulation is in progress, the roller 382 is at an elevation to cause the rack to be in mesh with the escapement pinion 74. Incidental to the operation of the tabulator lever 350, the roller 382 will be elevated and will lift the rack 72 free of the pinion 74, the carriage being then drawn to the left by its feed motor 78.

As stated hereinabove, the tabulator stop lever 350 is maintained operated while a tabulation is in progress. Referring to Figures 16, 17 and 20, the tabulator lever 350 by means of a pin and slot connection 387, has associated for pivotal movement on the same stud 359 therewith, an arm 388. For a purpose to be brought out later the tabulator lever 350 is lent capacity for some leftward displacement relative to its supporting stud 359, by the provision of a slot 390. The return spring 349 for the lever 350 is arranged to cause the same normally to pivot about the right end of the slot 390. On the right side member 92 of the adding machine frame, as at 391, there is pivotally supported a normally ineffective latch arm 392, bearing under the tension of a spring 393 against the right end of the arm 388. Upon actuation of the tabulator lever 350, see Figure 17, and consequent lifting of the arm 388, the latch arm 392 will swing automatically under said arm 388, wherefore the stopping nose 351 will remain elevated in position for engagement by a control dog 296 in the instituted tabulating run of the carriage. When consequently the nose 351 is engaged by a control dog 296, the nose 351, together with its lever 350 and the supporting slide plate 352, will be bodily displaced a short distance leftwardly. This displacement is against the urge of the spring 356 and the cushioning resistance of the dashpot device 362, and is to the limit provided for by the aforesaid padded stop 363. Under the action stated, the parts will assume transitorily the positions seen in Figure 20, wherein the right end of the arm 388 has just cleared the latch 392. Immediately thereafter the arm 388 and the lever 350, under the urge of the spring 349, assisted by the camming action of the effective function dog 296 against the nose, will restore, placing the nose 351 below the path of the control dogs 296.

As the tabulator lever 350 thus restores, the lever 376 also restores, and allows the carriage feed rack 72 to drop to normal position, wherefore the control of the escapement 74 over the carriage is reestablished. Following the lowering of the rack 72 into mesh with the pinion 74 the carriage moves a partial letter-feeding step in which lost motion is dissipated between the escapement pinion 74, the escapement wheel 73, and the carriage rack, the carriage coming resultingly to full rest.

It is desired that in certain computing columns the cycling operation will have no effect on the tabulating mechanism. This is the case, for example, where a typewriting column is required to be very closely to the right of a computing column. Toward accomplishing this end, the aforesaid selector 315 is provided for operation by a tappet 297 on any dog 296 defining a computing column from which no cycle instituted tabulating movement is desired. The selector 315 has its swinging end overlying a vertical rod 395 connected by a bell crank 396 to a forwardly extending push link 397 being horizontally guided at its forward end by a pin and slot provision 398. From Figure 1A, it will be seen that said link 397 stands normally well to the rear of the hook link 368 and has no controlling influence thereover.

However, when a tappet 297 operates the selector 315, the said push link displaces the said hook link 368 forwardly about its pivotal association with the bell crank 367, so that its hook 370 during cycling operation of the machine will take a path forwardly of and clear of the ledge 373 on the tabulator lever. Therefore, in any columnar position wherein it is desired that cycling of the machine have no tabulating effect, it is merely required that the control dog 296 defining such position be equipped with a tappet 297 for operativeness on the selector 315. Thus, the described tabulation suppressing feature permits an operator to typewrite closely to the right of a posted or total printed amount.

For tabulating the carriage at will from any letter-feed position, without machine cycling action, a tabulator key 400, see Figure 3, is provided to operate the tabulator lever 350. The operating train leading from the key 400 to the lever 350 includes a lifting element 399 underlying the right arm of the lever 350, it being deemed unnecessary to show the remainder of such train.

It will be remembered that the selector 315 is provided to incapacitate the aforedescribed cycle-operated hook link 368 for the tabulator lever 350. Thus, if the circumstances require it, an operator, by use of the key 400, may nevertheless tabulate past a typewriting column brought to the printing point incidental to tabulating the carriage to an immediately leftwardly adjoining computing column.

The machine of the invention includes a power return means for the carriage diagrammatically illustrated in Figure 21, and being of the type shown in the said patent to Sundstrand, No. 2,194,270. Such carriage return means includes a rack 416 on the carriage, and a frame-supported carriage-return pinion 417 in mesh with said rack. Said pinion 417 is rotatively loose on a vertical shaft 418, and a power driven clutch member 420, carried on and slidably splined on said shaft 418 is shiftable into driving relation with a clutch member 421 integral with the pinion 417. A three-armed clutch shifter 423 is pivotally mounted on the frame, and has one arm 424 reaching into a groove 425 of the clutch member 420, a second arm 426 cooperative with a spring-pressed, two-position detent 427, and a third arm 428 upreaching for anti-clockwise operation by a return instituting element 430, and for clockwise operation by a return terminating element 431. Both said elements 430 and 431 are carriage supported, the element 430 by leftwardly operating the arm 428 being effective to close the clutch 420, 421, and the element 431 by rightwardly operating the arm 428 being effective to open the same clutch. The element 430 is arranged on the carriage to close the clutch 420, 421 in a tabulation from the last column, and the element 431 is arranged on the carriage to open the clutch after the carriage has returned somewhat beyond an initial working column. The detent 427 serves to hold the clutch shifter 423 in either clutch position to which it is moved. The mechanism is designed for the carriage to continue return movement momentarily after the clutch opens. While the carriage is being power returned the feed rack 72 therefore remains in mesh with the escapement pinion 74, but return movement is made possible by a one-way ratchet connection, not shown, between said pinion 74 and and the escapement wheel 73, such ratchet connection being well-known in typewriters.

Return runs of the carriage may also be instituted by operation of a carriage return key 432, see Figure 3, which by connection not shown is capable to render the clutch 420, 421 closed.

It has been stated that the carriage-supported element 430 provides for automatic institution of a carriage return in response to a tabulating movement of the carriage beyond a certain columnar position. Inasmuch as incidental to such tabulation the tabulator stop lever 350 is held operated by the latch 392, it follows that the last active control dog 296, in response to a carriage return movement encounters the left side of the tabulator lever nose 351 and will cause the latter with its lever 350 to be displaced rightwardly. In being so displaced, the right end of the lever 350 swings the latch 392 from the arm 368, and, ensuingly the tabulator lever 350 will, under the influence of the spring 349, automatically reassume normal position, bringing the nose 351 below the range of the function control dogs 296. The carriage thus is able to proceed in return direction unobstructed. As hereinbefore stated, the return run of the carriage is ended few letter-feed spaces beyond the initial working column. To cause the carriage to tabulate thereafter to the said initial working column, means are provided to institute automatically a machine cycle in response to the opening operation of the carriage return clutch shifter 423 as affected under the carriage carried control 431. To this end, see Figure 7, there reaches into the groove 425 of the clutch element 420, the left end of a lever 434, which at the right is articulated to the upper end of a substantially vertical link 435. Said link 435 has a pawl member 436 normally overlying a pin 437 on an upright arm 438 integral with the bell crank 337 of the aforedescribed carriage-actuatable cycle-instituting mechanism. When the clutch 420, 421 is open as shown in Figure 7, the pawl 436 overlies the pin 437. In the movement of the clutch member 420 to closed clutch position, the pawl 436 moves downwardly, flipping idly past the pin 437 and taking up a position directly therebelow. In the clutch opening movement of the member 420, the pawl 436 moves unitarily with the link 435, and by means of a cam edge 440 thereon displaces transitorily the pin 437 rearwardly, and thereby causes the operation of the lever 337 and the mechanism leading therefrom to the cycle instituting dog 265. Thus, at the end of each power return of the carriage 10 there is automatically instituted a machine cycle, and consequently the carriage tabulates and comes to rest in the first working column, it being understood that the tabulation stopping lever 350 withdraws ultimately to idle position, as hereinbefore described generally, and that the carriage feed rack 72 in association with the escapement reassumes control over the carriage.

11. *Automatic control means to condition digit keys for typewriting or amount indexing*

As has been noted before, the digit keys 51 may be caused to serve either the type bars 17 or the adding machine indexing mechanism 107. The invention provides means, whereby the keys 51 are automatically operative for typewriting in typewriting columns, and whereby the same keys are automatically operative for amount indexing operation in computing columns. As has been hereinbefore noted, if the position of the pivoted control structure comprising the bars 136, 137, is as illustrated in Figure 1, the keys 51 are operative for typewriting, the hook ends of the type-action selecting links 53 being then in cooperative relation over the lugs 55 of the type bar actuators 43. This condition is obtained at the end of each forward stroke of a machine cycle at which time the hereinbefore described pivoted structure comprising the bars 136, 137 is always placed in the position of Figure 1. This is by provision of an arm 401 on the cycle rock shaft 250, having a pull link connection 402 with a downwardly extending branch 403 of one of the side members 135 supporting the rods 136, 137. Said link 402 is slotted to provide normally capacity for movement of the pivoted structure to a position wherein the bar 137 places the pendant elements 127 into communicative positions with respect to the indexing actuators 128. Said link 402 is operated on the forward stroke of each cycle, first idly a short distance forwardly, then in a downward, rearward sweep, pulling the pivoted structure about the pivot 139, slightly beyond the position seen in Figure 1. As this takes place, a latch lever 404, having a pivot at 405 and being urged clockwise by a spring 406, catches behind a shoulder 409 on one of the side members 135. The pivoted structure comprising the bars 136, 137, is under the constant urge of a spring 407 tending to turn it anticlockwise. It will now be seen that at the end of each cycle, before a tabulating movement of the carriage gets under way, said structure comprising the bars 136, 137 will be positioned as in Figure 1. Means are provided to swing the latch lever 404 free of the shoulder 409 in the tabulating approach of any computing column in which it is desired to have the keys 51 operative for indexing function, this causing said pivoted structure to swing under the tension of the spring 407 to the position seen in Figure 12, wherein the keys are operative for amount indexing function. For this purpose, see Figure 1, the lever 404 has a rearwardly extending arm 408 which through a vertically guided pin 410, seen in Figures 1A and 18, is operatable by the selector 313, the latter being operatable under carriage control by an appropriately provided tappet 297 on a computing column defining control dog 296. As seen in Figures 18 and 21, the selector 313 has its cam 323 a little to the right of those on the other selectors, namely, so located thereon that the control dog 296 under control of which the tabulation is effected will settle slightly to the left of such cam element. Therefore, the latch lever 404, after setting free the pivoted structure, is ready to assume again its normal latching position, and will do so when the machine is cycled and the pivoted structure 135, 136, 137 is consequenty cycle-actuated to the normal position seen in Figure 1.

12. *Manual control to condition digit keys for typewriting or amount indexing*

The machine, see Figures 1, 12, 13 and 23, includes a manual control 412 to determine, at will, the position of the pivotal structure 135, 136, 137, such control protruding through a vertical slot near the right end in the front panel of the typewriter. This manual control 412 has a neutral position shown in full lines in Figure 1, wherein the carriage 10 exercises automatic control over the pivotal structure 135, 136, 137, in the manner hereinabove described. Said control 412 is in the form of a setting arm fast on a transverse rock shaft 413 which is pivotally supported in both side walls 71 of the typewriter. Said shaft 413 also supports unitarily associated therewith a two-armed element 414. If the manual control is moved to the lowest position seen in Figure 12, the pointed arm of the element 414 will cam the latch arm 404 upwardly to free the shoulder 409 of the pivoted structure 135, 136, 137, so that this structure under the tension of the spring 407 will assume the position shown. Thus through the controlling medium of the rods 136, 137, the keys 51 will then be operative solely upon the actuator levers 128 of the amount indexing mechanism. In the event that the latch arm 404 has been carriage-actuated, the setting of the control 412 to the position of Figure 12 will simply cause the lever 404 to remain operated. Adjustment of the control 412 to the Figure 14 position provides that the notched arm of the element 414, by cooperation with a forwardly and upwardly reaching branch of the right side member 135 of said pivoted structure 135, 136, 137 will cause said structure to be moved to and held in the position shown, providing thereby for operative association of the hook-ended links 53 with the typeaction actuators 43, and therefore for effectiveness of the digit keys 51 for typewriting action. It is to be noted that when the manual control 412 is moved to the positions illustrated in Figures 12 and 14 the control of the carriage over the pivot structure 135, 136 and 137 is fully cancelled. Upon restoration of the manual control 412 to the position seen in Figure 1, namely the neutral position, the carriage in succeeding columns again exercises full automatic control over the rocking structure 135, 136, 137. The manual control 412 is detented, in a manner not shown, to stay in any one of its three adjusted positions.

Inasmuch as the carriage 10 is normally under letter-feed control, it will be seen that by setting the control 412 to the position of Figure 14, an operator may typewrite even though the carriage may be in a computing column. In accounting work one may typewrite the name and address of a customer at the heading of a work sheet, or any other notation. By positioning the control as in Figure 12, the digit keys 51 are operable for indexing amounts in a column wherein the control dog 296 may not be equipped with a tappet 297 for operating the selector 313 for capacitating the indexing mechanism. The machine has thus great flexibility of use.

13. *Incapacitation of function control selectors for typewriting*

In conjunction with setting the control member 412 to typewriting position, the machine preferably includes means to lower the function selectors 301 to 318, inclusive, below cooperative range with the tappets on the control dogs 296. This is to provide for unimpeded, lively letter-feeding movement of the carriage during typewriting. It serves also to incapacitate the cycle-instituting selector 316 which usually is operated in the reaching of a total printing column, and which would make it infeasible to typewrite at the right of such a column.

For incapacitating the said selectors, the common pivot rod 319 is adapted to be lowered from the position seen in Figures 1, 7 and 18, sufficiently to swing all selectors about their right ends below cooperative range of the function control dogs. As seen in Figure 23, the pivot rod 319 for this purpose is accommodated at its opposite ends for displacement in vertical guide slots 441 provided in the front and rear walls 321, 321a of the selector housing, and is supported on spaced upstanding ears 442 of a plate 443 which is contiguous to the web 322 of the selector housing. A slide 444, guided for fore and aft movement in perforations of the housing walls 221, 221a, by means of pins 445 thereon extending into cam slots 446 in said plate 443, is capable to locate selectively the latter in the upper position seen in Figures 1A and 23, or in a lower position, placing all selectors below operative range of function control dogs 296. In Figure 23, the slide 444 is in a forward position and pins 445 by cooperation with the slots 446 hold the plate 443 elevated. The slide 444 is connected to the control member 412 by means of a link 447 reaching forwardly from the slide and having an articulation with an arm 448 carried fast on the contol member shaft 413. Whereas the control 412 is situated near the right side wall 70 of the typewriter, said arm 448 is closely located near the opposite side wall. Intermediate the side walls 70 the shaft 413 is bowed slightly forward to provide working clearance for the type action sub-levers 37.

Operation of the control member 412 to the middle position seen in Figure 14, that is the typewriting position, will move the slide 444 also to a middle position, thereby camming the plate 443 down, the pins 445 in such action taking up positions in the upreaching elbow parts of the slots 446. If the control 412 is moved to the position seen in Figure 12, namely the computing position, the plate 443 resultingly is raised, the pins 445 for such action moving into the rear ends of the slots 446. It will be noted that the opposite ends of the slots 446 are horizontal, and that consequently the plate 443 and the pivot rod 319 are firmly supported when the control lever 412 is in either of the two extreme positions.

14. Imprint effecting means for computing machine printing bars

A novel mechanism is provided for effecting imprints off the types of the differentially raised printing bars 18, 18a. This mechanism in no manner conflicts with the typewriting instrumentalities, and for quiet operation effects imprints by pressure.

It will be remembered that all digit printing bars 18 rise at least to "0" position in amount entering and total printing cycles. The printing bars 18 of insignificant order however, to prevent imprints thereby, are retracted from "0" position to below the printing line during all item entry cycles before the imprint effecting means functions. The same is true whenever a total is printed by the bars except that when a total is "0," the two bars 18 of lowest denominational order will not be so retracted from the "0" position and thus will be effective to print each a zero to signify the clearing of a register.

The printing bars or members 18 are elevated in the general direction in which they normally lie, see Figure 1, namely with considerable clearance from the front side of the platen 11. This is to avoid interference or entanglement of the types 94 with an ink ribbon 450, see Figure 3, such ribbon being stretched closely in front of the platen behind the printing bars 18, 18a and the type guide 21.

All printing bars 18 reach their appropriate raised positions considerably before the end of the forward stroke of each item entry or total printing cycle, namely when the cycle-actuated rollers 272 associated with the forked levers 273 ride into contact with the upper fork tines thereof. At approximately this phase of the forward stroke of the cycle, the printing bars 18 are moved collectively into close proximity of the front face of the platen 11. Following this, at the beginning of the return stroke of the cycle, the printing bars are pressed seriatim into printing contact with the platen, beginning with the leftmost one.

To the end of collectively swinging the printing bars 18 rearwardly, a bail 451 is provided consisting of two side arms 452 and a cross member 453 having an elongate opening 454 wherethrough the printing bars 18 reach upwardly with clearance at their rear sides. Individually active spring prongs 455, reaching downwardly from the rear side of the cross member 453, provide that the printing bars lean normally forwardly in the opening 454. The said bail is mounted on a rock shaft 456 having pivotal support at spaced points in the spaced side members 92 of the adding machine framework, see Figure 2. Specifically referring to Figure 2 as well as to Figure 13, the shaft 456 has secured thereto at its left end, a forwardly and downwardly reaching cam arm 457 which contacts normally an abutment pin 458 under the tension of a spring 460. The normal position of the bail 451 is thus established as seen in Figure 1, providing for upward movement of the printing bars 18 in a spaced relation to the platen 11.

Near the end of the forward stroke of item entry or total printing cycle, namely when the universal bar 106 overlying the lifter arms 104 of the type bar actuators 95 reaches uppermost position, the arm 457 is engaged by a pin 461 provided on the arm 365 of the cycle rock shaft 250. Such engagement, as seen in Figure 13, results in a rearward rocking motion of the bail 451 and the swinging of the printing bars 18, as well as also the signal printing bar 18a, rearwardly about the location of the rear teeth of the bar driving gears 98. The rearward displacement of the printing bars is of small magnitude and slow enough so that the bars will not be carried by momentum into printing contact with the platen. During a substantial remainder of the forward stroke of the cycle, and an initial part of the return stroke, the pin 461 rides on a dwell 462, maintaining the bail 451 in the position of Figure 13, the printing bars being thus brought closely to the platen and ready to be pressed into printing contact with the platen by further rearward swinging movement independently of the bail 451, against the light resistance offered by the spring tongues 455.

At the very initial part of the return stroke of the cycle, such type bars which have risen and remained above normal position are pressed seriatim into full printing contact with the platen. A rolling device generally designated by the reference numeral 466 is provided for this purpose, and comprises a pivoted rolling member 467 having a concentric rolling face 468 for rolling contact with the front sides of the printing bars 18 and 18a. Said rolling member 467 is supported on a rolling carriage 470 which is guided to travel along a pair of bars 471 which extend at some distance in front of the platen and parallel therewith. Flanges 463, 464, provided respectively on the left and the right side walls 71 of the typewriter frame, support said bars 471, as by screws 465. Said carriage 470 with its rolling member 467 occupies normally the position seen in Figure 3, in which the printing bars 18 and 18a are free to rise. Preferably the rolling member 467 is arranged squarely in front of the printing line 19 on the platen. Said carriage 470 consists of two plates 472, one overlying the upper bar 471 and one underlying the lower bar 471, and rigidly joined together in spaced relations by shouldered studs 473 and 474 at the front of the bars 471, and also by a shouldered stud 469 at the rear of the bars. A pintle 475 to the rear of the bars 471 extending through said carriage plates 472 affords a pivot for the rolling member 467 and also for two disk-like rollers 476, each of the latter of which are arranged to roll along the rear face of one of the bars 471. The stud 473 carries between the carriage plates 472 a wide roller 477 for frontal contact with both the bars 471, whereas the stud 474 carries in frontal contact with a rear face on each of the bars 471 an individual roller 480. A latch arm 481 is pivotally mounted on the stud 474 between the rollers and reaches between the bars 471 for a purpose yet to be explained. A portion 482 of the rolling member 467 fits closely but movable along in the space provided between the two bars 471, this keeping the rolling element 467 at the level of the printing line.

A strong spring 478, attached at one end to the stud 469 and at the other in a tubular bracket 479 extending outwardly from the right side wall 71 of the typewriter, urges the said carriage 470 constantly to move rightwardly along said bars 471. However, the rolling carriage occupies normally the position shown in Figure 3, such position being obtained by reason of a flexible band 484 of steel or other material attached to the carriage 470 and extending leftwardly therefrom over a frame-supported guide pulley 485 and downwardly to a cycle-actuatable arm 486. Said arm 486 is supported in an upright forked post 487 rising from the adding machine base frame 167 and affording a horizontal slot provision 488 in which a pin 489 fast on the arm 486 is adapted to move forwardly and rearwardly, to the effect of allowing the point of connection of the band 484 with the arm 486 to travel in the plane of the pulley 485. The adding machine cycling mechanism is active upon the arm 486 by means of a short arm 491 articulated with the latter and rotatively loose on the left end of the cycle rock shaft 250. Said short arm 491 is forced to a normal position at the end of each cycle, see Figure 5, by the adjustable abutment provision 492 carried on the arm 365 which is fast on the cycle rock shaft 250. The lengths of the arms 491 and 486 and the point of articulation therebetween is so chosen that as the arm 486 assumes different positions, the draw band connection travels in the plane of the pulley 485.

In the full cycle position of the parts, as seen in Figures 3 and 5, an escapement lever 493 blocks upward movement of the arm 486 by cooperation of an escapement shoulder 494 thereon with a pin 495. This escapement lever 493 is pivoted at 496 on an upright bracket 497, see Figure 3, and includes an upreaching arm 498 lying normally in the path of a pin 510 on the cycle actuated arm 365. Said escapement lever is biased towards the normal position seen in Figure 5 by a torsion spring 511. Except under special circumstances yet to be explained, at the very end of the forward stroke of each cycle, said pin 510 displaces said escapement lever 493 about its pivot 496 clockwise of Figures 5 and 13, to move its escapement shoulder 494 free of the pin 495, and to move another escapement shoulder 512 into the path of a pin 513 on the arm 486. The arm 486 thus being free for some upward movement, the rolling carriage 470 under the power of its actuating spring 478 will assume the position seen in Figure 8, wherein the rolling element 467 is in readiness for pressing action on the leftmost printing bar 18. At the very beginning of the return stroke of the cycle, the pin 510 leaves the escapement lever arm 498 to the restoring action of the spring 511, wherefore the escapement pin 513 again stands free of the escapement shoulder 512, with the effect that now the rolling carriage is drawn rightwardly by the actuating spring 478 to the position seen in Figure 10, against a padded stop 524 provided on the upper bar 471. During the movement of the rolling carriage 470 from Figure 8 to Figure 10 position, the rolling face 468 presses one printing bar 18 after another against the platen. During such action, a downwardly projecting roller 514 on the rolling element 467, normally bearing rightwardly against the right side of a stationary guideway 515 under the tension of a torsion spring 518, rides forwardly in this guideway, the latter being designed to so control the rolling element, that its rolling face 468 rolls across the printing bars in a true rolling fashion and in a definitely controlled relation thereto. As seen in Figure 3, said guideway 515 is fast on a bracket 516 reaching inwardly from the left side plate 71 of the typewriter frame.

In rolling across the bars 18, 18a, the rolling element 467 squeezes one by one the printing bars with appropriate printing pressure against the platen, it being understood that the bars 471 along which the rolling carriage rolls are reacted against by the rollers 476, and are appropriately located to furnish the desired printing pressure. It will be noted that the rollers 476 roll along rear faces afforded by the bars 471, said faces extending parallel to the platen and facing the printing members at a distance in front thereof. Said rollers 476 constitute means adapted to travel along said face on said bars 471 in reacting contact thereagainst in order to guide said rolling member 466 in its movement across said printing members 18 in a path to exert rearward pressure against the latter to effect printing. Obviously, the rollers 476 with respect to the rolling element 466 in the stated action turn oppositely on the pintle or pivot 475 which is common thereto. The total rolling pressure exerted against the platen at any time does not exceed appreciably the pressure required to effect an imprint off two adjoining printing bars, since at no time more than two printing bars are fully squeezed into printing contact. Thus, neither the platen nor the carriage are unduly strained while the printing action takes place.

In Figure 9 the rolling element 467 is shown as having progressed partially across the set of printing bars. It will be perceived from this figure, that the forward pressure of the platen exerted on the printing bars 18 directly at the left of the dot and dash line 517, balances substantially the resistance against rearward displacement offered the printing bars directly at the right side of said line. Thus, while the bars at the right of said line 517 resist rightward propagation of the rolling element, the bars at the left will favor it. Relatively little force is thus required to move the rolling carriage for printing action.

In order to control the speed of movement of the rolling carriage there may be provided, see Figure 5, a fluid dashpot 521 in association with the steel tape actuating arm 486. This fluid dashpot is one-way-acting to control the speed of only the rightward movement of the rolling carriage 470. Moreover, a piston rod 522 of this dashpot has preferably a lost motion connection 523 with the arm 486 enabling the latter to move initially unimpeded to or near to the position wherein the pin 513 engages the escapement shoulder 512.

It is to be understood that the printing action of the rolling carriage 470 is concluded before the printing bars 18 and 18a start their return toward normal position. In moving to the Figure 10 position, the rolling carriage 470 with the rolling element 467 has travelled in excess of the distance necessary to effect an imprint off the leftmost printing bar, namely the signal bar 18a. The rolling face 468 consequently has receded forwardly from the printing bars 18, 18a through continued cooperation of the roller 514 with the right side of the guideway 515. Moreover, the pivotal position of the rolling element 467 has become such that the aforesaid latch element 481 to the front thereof has caught a shoulder 525 on the rolling element under the tension of a spring 526.

After the rolling carriage has assumed the position of Figure 10, that is after an initial return phase in the cycle, the printing bars are collectively moved from the platen through the bail structure 451 under the tension of the spring 460, as the pin 461 leaves the operating arm 457 thereof. Shortly further in the return stroke of any printing cycle, the rolling carriage 470 is forcibly returned by said steel band 484, through the operation of the arm 491 effected by the abutment 492 on the cycle-operated arm 365, it being understood that the arm 491 is stationary while the abutment 492 during the first part of the return stroke travels to pick up the arm 491. The rolling element 467 stays in the rotative position seen in Figure 10 throughout the return of the rolling carriage, so that conflict is avoided with the printing bars 18 and 18a. During said return leftwardly, the rolling element passes to the left of the guideway 515 and finally the latch 481 carried on said carriage encounters an abutment pin 530 between the bars 471 and thereby is forced away from the shoulder 525 of the rolling element. The latter then turns clockwise under the urge of the spring 518 to the normal position, see Figure 3, until the roller 514 engages again the right side of the guideway 515. The left side of the guideway 515 reaches rearwardly short of the right side to allow the roller to swing clockwise into place. For noise reducing effect the guideway 515 may be resiliently mounted or formed of a non-sonorous material. As the rolling carriage reaches its returned position seen in Figure 3, the escapement pin 495 on the steel band operating arm 486 catches under the escapement shoulder 494 on the spring-pressed escapement lever 493, thus holding the arm 486.

The rolling element 467 is sickle-shaped and includes a scooped out portion 531 in order that the typewriter bars 17 may have a clear path to the printing point at all times and regardless of the position of the rolling element. The pulley 485 for the steel band is preferably supported on a bracket 532 secured to the lower bar 471.

The ink ribbon 450 extends between two ribbon spools 535 with a straight stretch to the rear of the type guide and the printing bars 18. Preferably said straight ribbon stretch is normally posed below the printing line 19. A ribbon vibrating mechanism may include a ribbon vibrating part 536 directly to the right of the typewriting point, and another ribbon vibrating part 537 leftwardly of the group of printing bars 18. Neither the mechanism for vibrating the parts 536, 537 nor the mechanism for feeding the ribbon has been shown.

It will be remembered that the rolling element is active upon the printing bars somewhat after the commencement of the return stroke of the cycle. Means are provided to detent the printing bars in their appropriately elevated locations at the very beginning of the return stroke of each cycle and until the printing action of the rolling element 467 has taken place. To this end, see Figure 1, an aligning bail 545 is provided in association with the gears 98 by which the printing bars 18 and 18a are raised. This aligning bail 545 is connected by a link 544 to an arm 543 which carries a roller 542 bearing normally on a dwell-formed portion 541 on the cycle shaft operated element 271. The position of the parts is normally such that the bail 545 is held clear of the gears 98. Under control of said dwell-formed portion 541 and other means, including an arm 549, the aligning bail 545 is spring drawn into the notches of the gears 98 at the end of the forward stroke of each cycle, and will stay there until the printing operation by the bars 18, 18a has been effected. This aligns the types from which the imprints are made. Said patent to Sundstrand, No. 2,194,270 embodies a similarly controlled aligning bail for action on the actuators 95 and for substantially the same purpose, so that a more detailed description of the mechanism for controlling the present bail is deemed unnecessary.

15. Means to provide for imprints of significant orders only

In the type of computing machine used, the actuators 95 rise at least to zero position in all cycles, this providing for the reloading of the transfer mechanism. To prevent imprints off printing bars 18 of insignificant order, a mechanism is provided which restores insignificant order printing bars below the operative range of the rolling element 467, such mechanism becoming effective slightly ahead of the said rolling element 467 and remaining effective at least until the printing phase in the cycle has passed.

Directing attention particularly to Figures 1 and 6, a rock shaft 561 pivotally supported in the two spaced frame members 92 of the computing machine framework, carries by means of two spaced arms 562, a bail rod 563. Upon this rod are pivotally carried in individual association with the register actuators 95, substantially upright hook elements 564. The bail arms 562, as shown in Figure 1, abut normally a stationary rod 565 under the tension of springs 566 which all have one end connected to said elements 564 and another to said rod 565, such springs serving also to urge the upper ends of the hook elements 564 forwardly, so that inclined front faces 567 thereon normally engage a stationary rod 568, and so that hooks 570 thereon lie normally slightly to the rear of rear edges 569 on the actuators 95. During any item entry cycle at least some actuators 95 rise above zero position in a fairly early cycle phase. Usually some actuators 95 rise only to zero position, and shoulders 571 on their upper ends lie then below the hooks 570 of their associated hook elements 564. The rear edge 569 of any actuator rising above zero position, on the other hand, will lie in front of the hook 570 of its associated element 564. By means to be described, in a late phase of the forward stroke of each cycle, the bail 563 is rocked downwardly carrying all hook elements 564 therewith. As this takes place, the springs 566 urge the elements 564 to swing forwardly. Those elements 564 which are associated with actuators 95 that have risen above zero position will come in resilient contact along the smooth rear edges 569 of their associated actuators and will glide idly down therealong. However, any element 564 associated with an actuator to the left of the highest order one that has risen above zero position will swing forwardly to place its hook 570 on the shoulder 571 of its associated actuator and to draw the latter down to normal position. The elements 564 associated with such actuators which have not risen above zero position but which are to the left of actuators that have risen above zero position would also move over and engage the shoulders 571, but for the fact that each element 564 has a tongue 572 reaching leftwardly behind its immediately leftwardly adjacent elements. Thus in view of said tongues 572, any element 564 contacting against the rear edge 569 of its associated actuator 95 will block all elements 564 to the right thereof from swinging forwardly. The downward motion given to the elements 564 affects thus only the actuators which happen to be of insignificant orders, drawing them down to normal positions, and lowering the printing bars of insignificant order below the operative range of the rolling element 467.

The bail shaft 561, see Figures 1 and 6, has a forwardly reaching arm 575 which is operatable by an arm 576 mounted upon and rearwardly reaching from a rock shaft 577. The latter is pivotally supported in the left frame member 92 and a bracket 578 located to the left thereof. The left end of the shaft 577 has a downwardly and forwardly reaching arm 580 adapted for operation by the pin 461, similarly to the arm 457, but slightly in advance thereof. Therefore, just before the printing bars 18 are swung rearwardly toward the platen, all the actuators 95 representing insignificant orders are drawn downwardly to lower the associated printing bars 18 to non-printing position. After operating the arm 580 the pin 461 rides along a dwell on the latter, to maintain the affected actuators 95 lowered until printing has been effected early in the return stroke of the cycle. When the pin 461 leaves the arm 580, the bail 562, 563 reassumes the normal position seen in Figure 1, allowing the lower actuators 95 to rise again to zero position, they being restored with the other actuators near the end of the cycle in the usual manner by the universal bar 106 associated with the actuator lifters 104.

In total and sub-total printing operations, the actuators 95 rise, in the forward stroke of of the cycle, under control of and in accordance with the digit values contained in the wheels of the controlling register. Toward the end of the forward stroke of the cycle all actuators which have risen to positions representing insignificant zeros are drawn down by the elements 564 in the same manner as in item entries, wherefore the significant orders of the total only are printed.

16. *Zero total signified by printing of two zeros*

In the event a total is zero, it is desired to signify such fact by the printing of two zeros by the two lowest order printing bars 18. To this end, incidental to all totalling and sub-totalling operations, the hook elements 564 associated with the two lowest order actuators 95 are controlled to stay free of the actuator shoulders 571, all other elements 564, on the other hand, by reason of the structure described, being effective upon their associated actuators 95 to lower them and prevent printing.

Specifically referring to Figures 5, 6 and also 15, a total and a sub-total control slide for the crossfooter 213, herein respectively numbered 582 and 583, as well as two similar slides 582a, 583a for the rear registers, all old in said Patent No. 2,194,270, are both in control of the two lowest order hook elements 564 through a train of mechanism comprising a horizontal lever 585, a bail 586, a link 587, and a lever 588, the latter having a pin 590 for engagement with the hook element 564 of second lowest order, which element for this purpose has a higher reach than the other. Normally the parts of said train are positioned as in Figures 5 and 15, but whenever the machine is conditioned for a totalling or sub-totalling operation either by carriage control or key control, one of said slides 582, 583, 582a, 583a moves forwardly to operate the lever 585 and said train, so that the pin 590 comes to lie rearwardly against the hook element 564 of second lowest order. During the totalling or sub-totalling cycle instituted thereupon, the hooks 570 of the two lowest order elements 564 will move idly down to the rear of the actuator shoulders 571, leaving the two lowest order actuators 95 and associated printing bars in zero position.

The lever 588 is carried pivotally on a rightwardly projecting end of the bail rod 563. The lever 585 and the bail 586 are of conventional structure, and the latter has connected thereto and is in control of a usual zero stop plate 591, see Figures 5 and 6. This plate 591 is disposed at the left side of the bed of the index pins 108, to block such of the tail pins 112 that are posed therebelow, from rising above zero position in all cycles except totalling cycles. Actuation of said bail 586 displaces said stop plate 591 forwardly of said tail pins 112, wherefore all actuators 95 are free to rise in totalling and sub-totalling operations.

17. *Means to prevent idle operation of imprint effecting means*

It is desired to render the imprint rolling element 467 only operative in cycles when imprints are to result. During all computing cycles, at least one of the hook elements 564 will tilt forwardly and will encounter the rear edge 569 of its associated actuator.

Said hook elements 564 have all a rear shoulder 592 and these shoulders of whatever hook elements do encounter the rear edge 569 of an actuator will descend on a bail bar 593 to depress it. In any non-computative cycle, such as a cycle wherein the transfer mechanism is conditioned for a total-taking cycle, the said hook elements 564 take a forward path with the shoulders 592 moving down forwardly of the bar 593 and without effect thereon. The bar 593 is part of a bail including side arms 594 fast on a rock shaft 595, the latter being pivotally supported in the framework of the machine, and having at the left, see Figure 6, a downwardly reaching arm 597. A spring 598, see Figure 5, establishes the normal position of the bail by locating the arm 597 against an abutment pin 600. The arm 597 is in control of a lever 601 having a cam face 602 contacting it. The lever 601 is pivoted as at 603 to a bracket for movement in a substantially horizontal plane. Bearing rightwardly against the forwardly reaching arm of the lever 601, under the tension of a spring 605, is the arm 498 of the escapement lever 493 in control of the imprint effecting means. Said arm 498 constitutes a lever portion which is hinged, as at 606, for lateral swinging. In the full cycle position of the machine, the described parts are disposed as in Figures 5 and 6, the hinged arm 498 being inclined to the right, out of the orbit of the pin 510 of the cycle-operated arm 365. Said arm will stay inclined to the right in any non-printing cycle, incapable of operation to cause printing. In any cycle wherein one of the printing bars 18 is to effect an imprint, the bail 593 will be operated by one or more of the hook elements 564, toward the end of the forward stroke, and before the printing phase of the cycle is reached. Consequently, by camming action at 602, the lever 601 will be operated and will swing the hinged arm 498 to the upright position indicated in dot-and-dash lines in Figure 6, into operating range of the pin 510. Thus, at the end of the forward stroke of only such cycles wherein a number is required to be printed, the printing carriage escapement lever 493 will be actuated, resulting in an operation of the rolling element 467, as the pin 510 starts to return. The stated operation takes place also in a totalling operation when two zeros are to be printed to signify a clear state of the controlling register.

18. *More on function control keys*

The function control keys 302a to 312a, inclusive, see Figures 4 and 15, and also Figure 3, are on rightwardly and forwardly upreaching extensions 610 of vertical stems 611, which in said Patent No. 2,194,270 have keys directly surmounting them. The stems 611 are in their usual locations relative to the adding machine mechanism, and the extensions 610 are provided for location of the function control keys to the right of the typewriting keys 50, 51. The key extensions 610 include each a vertical portion which is guided in a stationary bracket plate 612, the stems 611 being guided at the bottom, as usual, in a base flange of a bracket 613.

Similarly as disclosed in said Patent No. 2,194,270, the various keys 302a to 312a, inclusive, and also a Credit Balance key 614, serve to condition the machine manually for various functions, and serve also to control the extent of rise of the signal printing bar 18a, by usual means, these means including bell cranks 615 and push rods 616. Depending upon which of the push rods 616 is operated, a tail pin 617 associated with an actuator similar to those numbered 95 will appropriately rise to control the type-selecting movement of the signal printing bar. A stop 618 normally blocks rise of the tail pin 617, but is withdrawn incident to the operation of any function control key, in a usual manner.

19. *Blank cycle enforcing mechanism*

To assure that the units transfer mechanism for the crossfooter or the registers are in normal condition, ready for action, preparatory to a totalling or a sub-totalling operation, means are provided in association with the total and sub-total keys 304a, 306a, 305a and 307a, to free such keys only for depression in the event the machine is first given a blank cycle, that is, a cycle in which neither the crossfooter nor the registers are affected.

The mechanism for this is shown in Figure 15, wherein a blank cycle is assumed to have taken place, and wherein consequently a locking slide 621 is in a rearward position, presenting blocking shoulders 622 thereon to the rear of and out of operating range of protuberances 623 on the stems 611 of the total keys 304a, 306a and the sub-total keys 305a and 307a. Thus, in Figure 15, these keys are free to be operated.

A spring 626 constantly tries to move the locking slide 621 forwardly to move the shoulders 622 under the related protuberances 623. Toward conclusion of any blank cycle, in a manner to be stated, a control member 627, having pivotal support at 628, assumes a lowered position, seen in Figure 15, under the tension of a spring 630. In this position of the member 627, a cam face 631 thereon is operative on a pin 632 of the locking slide 621 to locate the latter in a rearward, ineffective position.

A pendant arm 635 has a lug 637 projecting laterally into an opening of the member 627 which affords a high recess 638, a low recess 640, and a down-reaching nose 641 therebetween. After any blank cycle, the lug 637 is contacted by the control member 627 in the high recess 638 as shown in Figure 15. After any computing cycle, the lug 637 is posed underneath the low recess 640. To allow the pendant arm 635 to swing forward in some of the cycles, a pin 639 on a member 642 which is carried on the cycle rock shaft 250, encounters a cam face 643 on the control member 627 in the forward stroke of every cycle. The cam face 643 is shaped to cause the control member 627 to be sufficiently raised after the beginning and up to the end of every cycle for the lock slide shoulders to be located under the key protuberances 623. Moreover, the cam face 643 is shaped to cause the nose 641 to be lifted above the lug 637 before the end of the forward stroke of the cycle is reached.

Provision is made so that at the end of the forward stroke of any computing cycle, and for the remainder of each such cycle, the lug 637 of the arms 635 will underlie the low recess 640. It will be remembered that during any computing cycle, the bail 593 is downwardly displaced through the hook elements 564. This displacement of the bail 593 is utilized to actuate the pendant arm 635 forwardly. The means for this comprises at the right end of the bail shaft 595 a downwardly reaching arm 633, and a link 634 reaching forwardly from the arm 633 and having a pin and slot connection with the pendant arm 635. A spring-urged latch 644 swings into position behind the arm 633 as the bail 593 reaches operated position. Consequently, at the end of any computing cycle, the pendant arm 635 lies in a forward position with the lug 637 posed below the low recess 640, and will remain thereat so long as the latch 644 remains effective.

In the return stroke of any cycle, the pin 639 riding rearwardly along the cam face 643 causes the control member 627 to be drawn downwardly by the spring 630. If the cycle is a computing cycle, the lug 637 is contacted by the low recess 640, in front of the nose 641, thus blocking the pendant arm 635 against movement to rearward position. The position of the control member 627 is then still sufficiently high for the locking slide 621 to remain in forward, effective position. As any computing cycle nears conclusion, a pin 645 on the cycle rock shaft 250 releases the latch 644, causing the bail 593 to be spring restored. The pendant arm 635, however, remains in forwardly displaced position because rearward movement of the lug 637 is obstructed by the nose 641. Inasmuch as the lock control member 627 is prevented from moving to lower position, the lock slide 621 remains in locking position. Moreover, it will remain thereat until the machine is given a blank cycle. Toward the conclusion of such blank cycle, the control member 627 moves to the lower position seen in Figure 15, this taking place by the power of the spring 630, under control exercised by pin 639 in conjunction with the cam 643. From the above, it follows that at the end of any computing cycle, the arm 635 is in a forward position, and at the end of any blank cycle, the same arm is in a rearward position. Always at the beginning of a first computing cycle following a blank cycle, the lock slide 621 will move to effective position. It will remain thereat until the end of the first blank cycle following a computing cycle. Moreover, the lock slide 621 will always be in effective position after the beginning of a blank cycle and until such cycle nears conclusion. This means that every operation of one of the total or sub-total keys must be preceded by a non-computative cycle, commonly termed a blank cycle.

20. Other control keys

The machine of the Sundstrand Patent No. 2,194,270 includes, directly to the left of a group of digit keys, a correction key for restoring the function control keys 302a to 312a, a correction key for restoring the index pins 108 and the denomination shifting carriage 111, a back space key for back spacing said carriage 111, and an item repeat key to suppress the restoration of the said carriage 111. The stems which these keys surmount are retained in the present machine, and are respectively numbered 651, 652, 653 and 654, see Figure 4. These stems control the same mechanism as disclosed in said Sundstrand patent and are operable by keys 651a, 652a, 653a and 654a, located to the rear of the row of digit keys 51, see Figure 3. From said keys reach downwardly to the related stems 651 to 654, connecting members 651b, 652b, 653b and 654b, properly shaped for clearance with other machine parts. The said connections include portions which are vertically guided in a bracket 656.

21. Main assembly units

Referring particularly to Figure 19, and also Figure 1A, the machine of the invention preferably consists of three main assembly units. One of these units embodies mainly the typewriting mechanism including the typewriter side walls 71. Another unit supports most of the computing mechanism, particularly the base frame 167 and the two spaced frame members 92. Still another of said units consists of the carriage 10 with its supporting rail structure 16.

The typewriter unit is fastened upon the computing machine unit in a surmounting relation thereto, and to this end, each of the typewriter side members 71 has support at its front upon a rigid stud 669 projecting upwardly from the computing machine base frame 167, screws 670 serving to secure the side members 71 to said studs. At the rear each of said side members 71 has an ear 671 for attachment by a screw 672 upon a transverse bar 673 which is fastened upon the spaced computing machine side walls 92, as by screws 674.

To the end of supporting the unit comprising the work sheet supporting carriage 10, the rail structure 16 has downwardly reaching legs 675 for securement upon the said walls 92 of the computing machine.

22. Work example

A simple one of many possible practical business applications for which the machine is suited is illustrated diagrammatically in Figure 21. The numeral 660 designates a conventional accounting form, having four computing columns, namely, an old balance, a debit, a credit, and a balance (new) column. The three other columns, namely the second, third and fourth columns are purely typewriting columns.

The rail bar of the paper-supporting carriage 10 is indicated at 14, and the plate for supporting the function control dogs 296, at 298. The work sheet or form 660, the control plate 298 and the dogs 296 thereon partake in the movements of the carriage 10. On the other hand the printing bars 18, 18a, the type guide 21, the function selector cam elements 323 and the tabulator stop nose 351 are frame supported. The carriage 10 with its work sheet 660 is shown in position for the latter to receive in the old balance column an amount entry by means of the computing machine printing bars 18, the position having been arrived at in an automatic tabulation, instituted at the end of a power return of the carriage, and terminated by coaction of the leftmost function control dog 296 with the tabulator stop nose 351. Each of the various computing columns has associated therewith, as indicated by vertical dot and dash lines 347, one of the function control dogs 296, such dogs serving also as tabulator stops.

Due to the closely neighboring arrangement of the computing machine printing bars 18 relative to the typing point of the typewriting mechanism, the invoice column is in position to receive typing impressions from the typewriting instrumentalities when the old balance column stands opposite the printing bars 18. In other words, the function control dog 296 associated with the old balance column establishes also the initial position for typewriting in the invoice column.

For tabulation to the date column, and the description column, there are shown two dogs 296 which are devoid of any function control tappets 297 and serve purely as tabulating stops, dot and dash lines 348 indicating the association of these dogs with these columns. Between the dogs 296 which are associated with the credit and balance columns there is provided an extra dog with a sole tappet 297 for instituting an automatic machine cycle in the movement of the carriage from the credit to the balance column, the cycle so instituted providing in a conventional manner for conditioning of the units-transfer mechanism of the crossfooter and the registers in preparation for a total taking operation in the balance column.

In the tabulating approach of the initial column, namely the old balance column, the cam element 323 of the selector 313 is acted upon and passed over by its associated tappet 297, to condition the digit keys 51 for effectiveness on the indexing mechanism 107, and ineffectiveness on the typewriting mechanism. Incidental to the carriage reaching the old balance column as defined by its dog 296, tappets 297 on such dog ride onto the cam elements 323 of the cycle key conditioning selector 318 and the tabulation cutout selector 315. The machine includes the conventional provision disclosed in said Patent No.

2,194,270 whereby the crossfooter 213 stands normally selected for engagement in any cycle. To enter an old balance, with the carriage positioned as in Figure 21, it is merely required to finger the digit keys 51 appropriately to index such balance in the bed of pins 103, and then to cycle the machine by operating the cycle key 277.

It is to be noted that the carriage must be properly positioned, as otherwise the cycle key conditioner 218 will not be operated by a tappet 297, rendering the cycle key unable to institute a cycle. Upon operation of the cycle key 277 the printing bars will rise differentially in accordance with the indexed amount and imprints will be obtained off the printing bars 18 of significant orders only, all insignificant order bars being drawn below the printing point before the imprint effecting rolling element 467 becomes active. During the cycle the crossfooter 213 will be engaged for receiving the indexed amount additively on the down stroke of the actuators 95. Toward the end of the cycle the set index pins are restored. In view of the aforesaid presence of a tappet 297 over the tabulation cut-out selector 315, the cycle will not produce a tabulating operation, wherefore the carriage remains stationary. However, the cycling action causes the indexing mechanism to be rendered void of control of the digit keys 51, and causes the typewriting instrumentalities to be placed under control of these keys. This result stems from a return of the rocking structure comprising the bars 136, 137 to normal position to the control of the latch lever 404, such return being effected by the cycle-actuated link 402.

Inasmuch as the carriage is already in position for typing in the invoice column, the operator may type immediately the invoice number after the old balance is printed. No time whatever is wasted in any tabulating or any other carriage movement. It is to be noted here that the relative arrangement of the printing bars 18 and the type guide 21 makes possible very close arrangement of the invoice column with respect to the old balance column. To type even closer to the old balance column than shown, the carriage 19 may be back spaced one letter-feed space by use of a back space key, see Figure 3. The carriage letter-feeds in regular typewriter fashion after the typing of each character in the invoice column. To arrive next in the date column, the operator may operate either the space bar 665 or the tabulator key 400. If the latter key is used, the carriage will be arrested by the control dog 296 that is associated with the date column, but the carriage will be free to letter-feed for typewriting at the conclusion of such tabulation, as after any other tabulation. The description column is reached in similar manner. To reach the debit column, the tabulator key 400 is operated inasmuch as this key is able to institute a tabulating run in any position of the carriage. The function control dog 296 of the debit column has tappets 297 for operating the selectors 309, 313 and 318. Consequently when the dog 296 moves into effective position the register D will be selected, the indexing mechanism will be under control of the digit keys 51, and the cycle key conditioner will be operated. The operator need then only index the debit amount and operate the cycle key 277 to cause the debit amount to be printed and registered, the amount being accumulated in the crossfooter 213 and the register D, the latter of which accumulates the total of all debits.

In view of the absence of a tappet 297 over the selector 315 the cycling action will result in an automatic tabulating movement of the carriage to the credit column. The dog 296 associated with the credit column has a tappet 297 for operating the subtract selector 302 for the crossfooter. It has additional tappets for operating the selectors 310, 311 and 318, respectively for selecting the register C, for placing the indexing mechanism under control of the keys 51, and for conditioning the cycle key for effective operation. After indexing the debit amount, the machine is cycled by the key 277 and the carriage tabulates automatically to the position defined by the dog 296 which is a short distance to the right of the dog associated with the credit column. Cycling the machine in the credit column results in the printing of the credit amount, subtracts such amount in the crossfooter, and adds the same amount in the register C, the latter serving to accumulate a total of all credits posted.

The last dog referred to has a tappet 297 over the automatic cycle-instituting selector 316 and a so-called blank cycle will ensue which places the transfer mechanism in normal condition for the taking of a total. Such automatic cycle will result in a tabulation to bring the new balance column into active position. The dog 296 which serves to arrest the carriage in this column has tappets 297 over the paper feed selector, the total printing selector for the crossfooter, and the selector 316 for instituting an automatic cycle. The automatic cycle which thus is instituted in the balance column results in a total printing and clearing operation of the new balance having been computed in the crossfooter 213. The signal printing bar rises during the same cycle causing the shown signal character to be printed next to the new balance. Further, as a result of the cycling action in the balance column the carriage tabulates for the return instituting element 430 to throw the clutch shifter arm 428, thereby to institute an automatic carriage return.

The automatic cycle selector 316 remains unaffected during the return of the carriage since its cam element 323 folds idly down when any associated tappets 296 ride thereover in return direction. In a like manner, the selector 313 for rendering the adding machine indexing mechanism operative remains unaffected during carriage return.

By means fully disclosed in the patent to Anderson, No. 2,275,871, dated March 10, 1942, the totals accumulated in the rear registers may be printed automatically from time to time.

Certain data such as the name and address of a customer may be typewritten in the heading of the form in the space directly above the invoice, date, and description columns, and without necessitating the setting of the control lever 412 to the typewriting position, it being merely required to cycle the machine in the position of the carriage shown in Figure 21. In business applications where the first column is a typewriting column, and consequently the dog 296 associated with such column has no tappet over the selector 313, the keys 51 are conditioned for operativeness on the typewriting mechanism when the carriage reaches the first column, and thus it is not required to cycle the machine before commencing to typewrite.

If it is desired to typewrite in any computing column, in the present example in the debit, credit or balance column, or thereabove, the operator merely sets the lever 412 to typewriting position. This not only conditions the keys 51 for operativeness with respect to the typewriting mechanism but also lowers the automatic function selectors 301 to 318 below operating range of the dogs 296, thereby allowing fast and free letter-feed movement of the carriage, and without intervening machine cycling action.

Obviously the lever 412 makes possible use of the machine purely for typewriting.

23. Conclusion

Having explained the nature and objects of the invention and having specifically described a machine embodying the invention in its preferred form, what is claimed is:

1. The combination with a platen for backing writing material at a printing line, of a series of elongate juxtaposed printing bars positionable differentially endwise transversely to said printing line with clearance from said platen, each printing bar having on a side facing the platen a row of different type characters, means to mount said printing bars endwise differentially positionable and for actuation against said platen at the printing line after endwise differential positioning thereof, means to position said printing bars endwise differentially, a member for rolling movement across said printing bars at the sides thereof facing away from the platen, to press the printing bars seriatim against the platen at the printing line, and means to guide said member for pressure rolling movement across said printing members in a given path.

2. In a printing machine having a platen, a series of elongate juxtaposed printing members, each such printing member being adapted to raise differentially in front of the platen to locate desired types thereon opposite a printing line on said platen but spaced therefrom, means to locate said printing bars differentially in different raised positions to present different digit types thereon opposite said printing line, means affording face means extending parallel to the platen and facing said printing members at a distance in front thereof, and a device movable along said face means and including a rolling member to move in rearward pressure contact seriatim across the fronts of said printing members substantially at the level of the printing line, said device including means adapted to travel along said face means in reacting contact thereagainst in order to guide said rolling member in its movement across said printing members in a path to exert rearward pressure against the printing members to effect printing.

3. The combination with a platen for backing writing material at a printing line, of a series of elongate juxtaposed printing bars positionable differentially endwise tranversely to said printing line with clearance from said platen, each printing bar having on a side facing the platen a row of different type characters, means to mount said printing bars endwise differentially positionable and for actuation against said platen at the printing line after endwise differential positioning therefor, means to position said printing bars endwise differentially, a member for rolling movement across said printing bars at the sides thereof facing away from the platen, to press the printing bars seriatim against the platen at the printing line, means to guide said member for pressure rolling movement across said printing bars in a given path, and means to constrain said member in its rolling movement across said printing bars to turn substantially in non-slip surface contact with said printing bars.

4. The combination with a platen for backing writing material at a printing line, of a series of elongate juxtaposed printing bars positionable differentially endwise transversely to said printing line with clearance from said platen, each printing bar having on a side facing the platen a row of different type characters, means to mount said printing bars endwise differentially positionable and for actuation against said platen at the printing line after endwise differential positioning thereof, means to position said printing bars endwise differentially, a member for rolling movement across said printing bars at the sides thereof facing away from the platen, to press the printing bars seriatim against the platen at the printing line, means to guide said member for pressure rolling movement across said printing bars in a given path, spring means to move said member across said printing bars, means normally restraining said spring means against action on said member, motor operable cyclic means, means to energize said spring means by said cyclic means in a certain phase of its operation, and means operated by said cyclic means in another phase of its operation to render said restraining means inactive and thereby to cause said spring means to move said member across said printing bars.

5. In a printing machine having a platen for backing writing material at a printing line, a series of juxtaposed, elongate printing members having each a row of types facing toward said platen, said printing members adapted to be moved differentially endwise to locate desired types thereon differentially opposite a printing line and spaced from said platen, means to move said printing members differentially, and a device to operate the differentially located types against said platen, comprising, a rolling element movable in rolling contact across said printing members in a direction parallel to the printing line and thereby to press the differentially located types seriatim against the platen, roller means, pivot means associating said roller means and said rolling element coaxially turnable in opposite directions, and face means extending parallel to the printing line and facing said roller means at the side which is facing away from the platen, said face means arranged for said roller means to roll in reacting contact thereagainst and therealong to cause said rolling element in its movement across said printing members to press them against the platen, said rolling element and said roller means turning in opposite directions.

6. In a machine having a platen for backing writing material at a printing line, and having printing bars differentially positionable to bring different types thereon selectively opposite to said printing line and standing away from said platen, a rolling element adapted by rolling movement across said differentially positioned printing bars in a given path to press those types seriatim against the platen that are brought to the printing line, said rolling element normally disposed clear of said printing bars at one side thereof to allow said differential positioning of said printing bars, means to move collectively the differentially moved printing bars a step toward the platen after their differential positioning, and means thereafter to move said rolling element across said printing bars in said given path.

7. In a machine having a platen for supporting writing material along a printing line, and having a register containing a set of register wheels, a set of differential members below the platen operatively associatable with said wheels for running amounts thereinto, means to impart amount-representative differential movements to said members, a set of endwise movable printing bars upreaching at the front of the platen from way therebelow and having each a row of rearwardly facing digit types, motion multiplying gear means below the platen connecting each one of the printing bars with one of said differential members for differential positioning movements thereby at a motion increasing ratio, whereby said register wheels may be of relatively small diameter and the digit types on the printing bars relatively greatly spaced, each said gear means comprising a gear with which one of the printing bars is in geared motion-receiving engagement, means to guide the printing bars in their differential movements in a relation spaced from the platen and including means to maintain each printing bar in said geared motion-receiving engagement with its associated gear and with capacity for swinging movement against the platen, and means to move the differentially positioned printing bars against the platen.

8. In a machine having a platen for supporting writing material along a printing line, and having a register containing a set of register wheels, a set of differential members below the platen operatively associatable with said wheels for running amounts thereinto, means to impart amount-representative differential movements to said members, a set of endwise movable printing bars upreaching at the front of the platen from way therebelow and having each a row of rearwardly facing digit types, motion multiplying gear means below the platen connecting each one of the printing bars with one of said differential members for differential positioning movements thereby at a motion increasing ratio, whereby said register wheels may be of relatively small diameter and the digit types on the printing bars relatively greatly spaced, each said gear means comprising a gear with which one of the printing bars is in geared engagement, means to guide the printing bars in their differential movements in a relation spaced from the platen and including means to maintain each printing bar in geared engagement with its associated gear with capacity for swinging movement against the platen, and means to move the differentially positioned printing bars against the platen, comprising a rolling element to roll across the fronts of said printing bars to press them seriatim with pressure action against the platen.

9. In a machine having a platen for supporting writing material along a printing line, and having a register containing a set of register wheels, a set of differential members below the platen operatively associated with said wheels for running amounts thereinto, a set of endwise movable printing bars upreaching at the front of the platen from therebelow and having each a row of digit types thereon facing the platen, gear units below the platen connecting each one of the printing bars operatively with one of said differential members, each said gear units comprising a relatively small and a relatively large companion gear, each of said small gears being in toothed engagement with a differential member and each of said large gears being in toothed engagement with an associated printing bar, whereby said register wheels may be of relatively small diameter and the digit types on the printing bars relatively greatly spaced, means to guide said printing bars for differential movement upwardly in front of and slightly spaced from the platen for presentation of different types opposite said printing line, said guiding means comprising means to maintain said printing bars in toothed engagement with their associated large gears and with capacity for swinging movement against the platen, and means to actuate the differentially positioned printing bars against the platen.

10. In a machine having an amount register; a set of printing members having each a vertical row of digit types thereon including a "0" type, machine cycling means, total printing control means, means including said cycling means and responsive to said total printing control means to position said printing members differentially in front of a printing line in accord with digital values contained in the various orders of the register, means actuated by the cycling means after impartation of an initial positioning movement to said printing members and before a printing phase in the cycle is reached to lower below said printing line all printing members to the left of the leftmost one rising to a significant digit position, means responsive to said total printing control means to render said lowering means incapacitated with respect to at least one printing member, and means effective at a printing phase in the cycle to effect imprints off those printing members which remain located in front of said printing line.

11. In a computing machine having a register, a set of printing members having each a row of digit types including a "0" type and requiring type selecting movements that are one unit movement in excess of the digit values represented by the type to be selected, item entry means for said register including machine cycling means, to move said printing members differentially to type selecting positions, and in no instance to less than "0" position, total printing control means, cycling means actuatable means responsive to said total printing control means to cause movement of said printing members to printing positions in accord with the digital values contained in the register, and in no case to less than "0" position, said printing members whenever the total is zero moving all to "0" position, a device, cycling-means-actuated after all printing members have moved at least to "0" position and before a printing phase in the cycle is reached, to retract below printing position any printing member which is at the left of the leftmost printing member that has been moved above "0" printing position, means responsive to said total printing control means to incapacitate said retracting device with reference at least to one printing member, means including a rolling member common to said printing members and operable across the unretracted printing members under control of the machine cycling means at a printing phase in the cycle to effect imprints off all the printing members which have not been retracted by said device.

12. In a printing computing machine having a register comprising a set of wheels, the combination with amount-set-up means, cycling means, a set of printing bars, and an ordinal transfer mechanism for said wheels of a kind which after each amount entering cycle requires an extra non-computive operation of the cycling means to prepare the machine for printing the total contained in said register, of amount entering and printing means comprising said cycling means and said amount-set-up means to locate pertinent printing bars in amount-representative digits positions and insignificant order printing bars in "0" position, cycling-means-actuated-means sensitive to the printing bars to lower to a sub-zero position any printing bar which by said locating means is located in "0" position and is also of insignificant order, said lowering means including lowering elements individual to the printing bars and controlled by the printing bars to move in one path for printing bar lowering action and in another path for no effect on the printing bars, said lowering means in a non-computive cycle being controlled by said printing bars to move all in said one path to lower all the printing bars to sub-zero position, means comprising said printing bars and said cycling means to print the total contained in the register, a total key to render the total printing means effective, and means to lock said total key against operation at the beginning of any cycle and until a cycle occurs and nears conclusion in which all said elements move in said one path and will lower all said printing bars, comprising a universal member operable by any of said lowering elements moving in said other path, said universal member, whenever operated in a cycle, conditioning said lock means for effectiveness to near the conclusion of the next cycle.

13. In a printing computing machine having a register comprising a set of wheels, machine cycling means, means to institute operation of said cycling means, means conditionable and cycling-means-actuatable to enter amounts into the register and to print them, and cycling-means-actuatable means to total print amounts standing in said register, said entering and total printing means comprising a set of denominational order printing bars, the combination with an ordinal transfer mechanism for said register wheels of a kind which after each amount entering cycle requires a conditioning cycle before a total can be printed, of means comprised in said amount entering means and said total printing means to locate the printing bars of significant orders in digit positions representative of the amount to be typed and all the printing bars of insignificant orders in "0" positions, cycle-actuated means including elements individually associated with said printing bars and controlled thereby to move in one path to lower in each cycle below "0" position such of the printing bars as do not rise above "0" position and are of insignificant order, the other of said elements being printing-bar-controlled for cycle actuation in another path, a key operable to condition the machine for total taking action, means, cycling means controlled, to lock said conditioning key automatically at the start and up to the conclusion of each cycle, and means responsive to any of said elements being cycle-actuated in said other path to condition said locking means for effectiveness past the end of the cycle and up to the conclusion of the next cycle.

14. In a printing computing machine having a platen; a set of adding machine printing members movable endwise upwardly in front of a printing line on said platen, machine cycling means, amount-set-up means, means comprising said machine cycling means and said amount-set-up means to locate pertinent printing members in amount-representative digit positions ranging from "0" to "9" positions and to locate any insignificant order printing member in "0" position, cycling-means-actuated-means sensitive to the printing members after those of insignificant order have been located in "0" position, to lower to a sub-zero position, below said printing line, any printing member which by said locating means is located in "0" position and also is of insignificant order, said cycling-means-actuated-lowering-means including lowering elements individual to and controlled by said printing members to move in one path for printing member lowering action and in another path for no effect on said printing members, said lowering elements in a non-computive cycle being controlled by said printing members to move all in said one path, means common to all said printing members and operable to effect imprints by the printing bars at the printing line, a universal member operable by any of said elements which are moved in said other path, and means responsive to the operation of said universal member to cause an operation of said imprint effecting means.

15. In a machine having a platen; a set of adding machine printing members movable upwardly in front of a printing line on said platen, each printing member provided with a set of digit types including an uppermost "0" type, machine cycling means, amount indexing means for said printing members, means conditionable by the amount indexing means and responsive to said machine cycling means in a positioning phase of operation, to position the printing members of significant orders in appropriate printing positions in front of said printing line, said positioning means including means to position below said printing line such printing members as are of insignificant orders and whereby when in a machine cycle no printing is to occur all the printing bars in the said positioning phase become positioned below the printing line, means at the printing line and common to all the printing members, to actuate those printing members against the platen which become positioned in front of said printing line, and means sensitive to any printing member which by said positioning means is positioned in front of said printing line, to cause the machine cycling means to call said common actuating means into operation in a phase of the cycle which is later than said positioning phase, whereby said common actuating means is called into operation only in machine cycles wherein printing is to occur.

16. In a machine having a platen for backing writing material at a printing line, and having printing bars differentially positionable to bring different types thereon selectively opposite to said printing line and standing away from said platen, a rolling element adapted by rolling movement across said differentially positioned printing bars in a given path to press those types seriatim against the platen that are brought to the printing line, said rolling element normally disposed clear of said printing bars at one side thereof, machine cycling means, means including said machine cycling means to position differentially said printing bars, means controlled by said cycling means to move thereafter said printing bars collectively one step closer to the platen, and further means controlled by said cycling means to move said rolling element thereafter across said printing bars in the said given path.

(References on following page)

References Cited in the file of this patent

UNITED STATES PATENTS

| Number | Name | Date |
|---|---|---|
| 918,529 | Gardner | Apr. 20, 1909 |
| 1,063,084 | Thomson | May 27, 1913 |
| 1,125,499 | Duncan | Jan. 19, 1915 |
| 1,317,604 | Thieme | Sept. 30, 1919 |
| 1,784,862 | Barrett | Dec. 16, 1930 |
| 1,822,156 | Lasker | Sept. 8, 1931 |
| 1,948,958 | Coxhead et al. | Feb. 27, 1934 |
| 2,100,213 | Garbell | Nov. 23, 1937 |
| 2,194,270 | Sundstrand | Mar. 19, 1940 |
| 2,338,173 | Furman | Jan. 4, 1944 |
| 2,348,789 | Crosman | May 16, 1944 |
| 2,382,195 | Anderson | Aug. 14, 1945 |
| 2,496,357 | Rainey | Feb. 7, 1950 |
| 2,526,734 | Davidson et al. | Oct. 24, 1950 |